(12) United States Patent
Takahashi

(10) Patent No.: US 11,070,755 B2
(45) Date of Patent: Jul. 20, 2021

(54) IMAGING DEVICE AND SIGNAL PROCESSING DEVICE

(71) Applicant: CANON KABUSHIKI KAISHA, Tokyo (JP)

(72) Inventor: Keisuke Takahashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/822,519

(22) Filed: Mar. 18, 2020

(65) Prior Publication Data
US 2020/0314370 A1 Oct. 1, 2020

(30) Foreign Application Priority Data

Mar. 29, 2019 (JP) .............................. JP2019-066818

(51) Int. Cl.
*H04N 5/361* (2011.01)
*G06T 7/55* (2017.01)
*H04N 5/378* (2011.01)

(52) U.S. Cl.
CPC .............. *H04N 5/361* (2013.01); *G06T 7/55* (2017.01); *H04N 5/378* (2013.01); *G06T 2207/30261* (2013.01)

(58) Field of Classification Search
None
See application file for complete search history.

(56) References Cited

U.S. PATENT DOCUMENTS

| 2004/0234153 A1* | 11/2004 | Nakami ................... G06T 5/009 382/254 |
| 2009/0077359 A1* | 3/2009 | Chakravarthula ........ G06T 5/20 712/229 |
| 2012/0273655 A1* | 11/2012 | Ise ......................... H04N 5/361 250/208.1 |
| 2014/0146208 A1* | 5/2014 | Nakajima .............. H04N 9/045 348/294 |
| 2015/0348239 A1* | 12/2015 | Nestares .................... G06T 5/20 382/255 |
| 2016/0165124 A1* | 6/2016 | Chen .................. H04N 5/23212 348/349 |
| 2017/0142359 A1* | 5/2017 | Ikedo ..................... H04N 5/347 |
| 2017/0272675 A1* | 9/2017 | Kobayashi ............. H04N 5/378 |
| 2018/0024313 A1* | 1/2018 | Uchida .............. H04N 5/37457 382/255 |

FOREIGN PATENT DOCUMENTS

JP 2017-98931 6/2017

* cited by examiner

*Primary Examiner* — Christopher G Findley
(74) *Attorney, Agent, or Firm* — Venable LLP

(57) ABSTRACT

An imaging device includes a pixel unit where pixels including photoelectric converters are arranged, and a signal processing unit that processes signals from the pixel unit. The pixel unit includes a first region including pixels each driven in a first mode to read a signal based on charge generated by the photoelectric converters and a second region including the pixels each driven in a second mode to read more signals than in the first mode including a signal based on charges generated by a part of the photoelectric converters and a signal based on charges generated by the photoelectric converters. The signal processing unit calculates a first correction value based on an average of a first data group from the first region and a second correction value based on an average of a second data group from the second region by using the first correction value as an initial value.

15 Claims, 23 Drawing Sheets

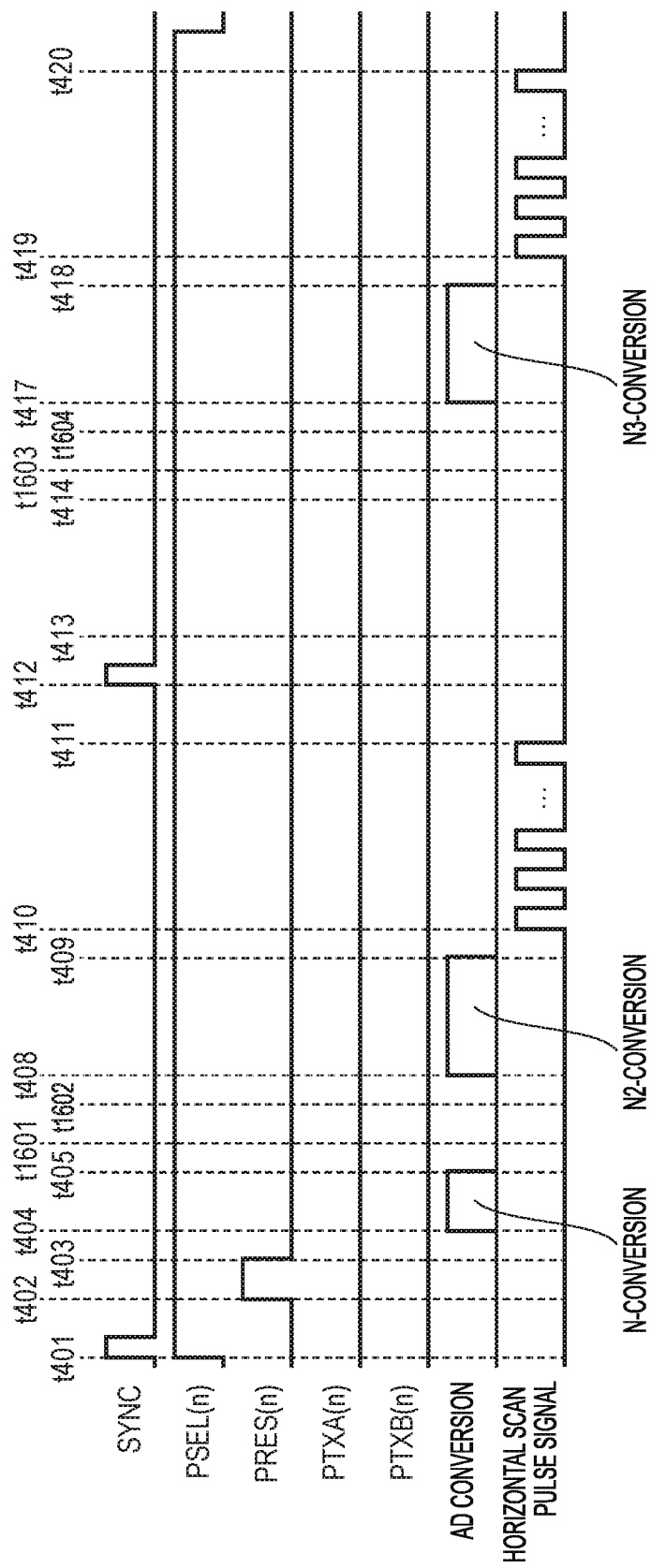

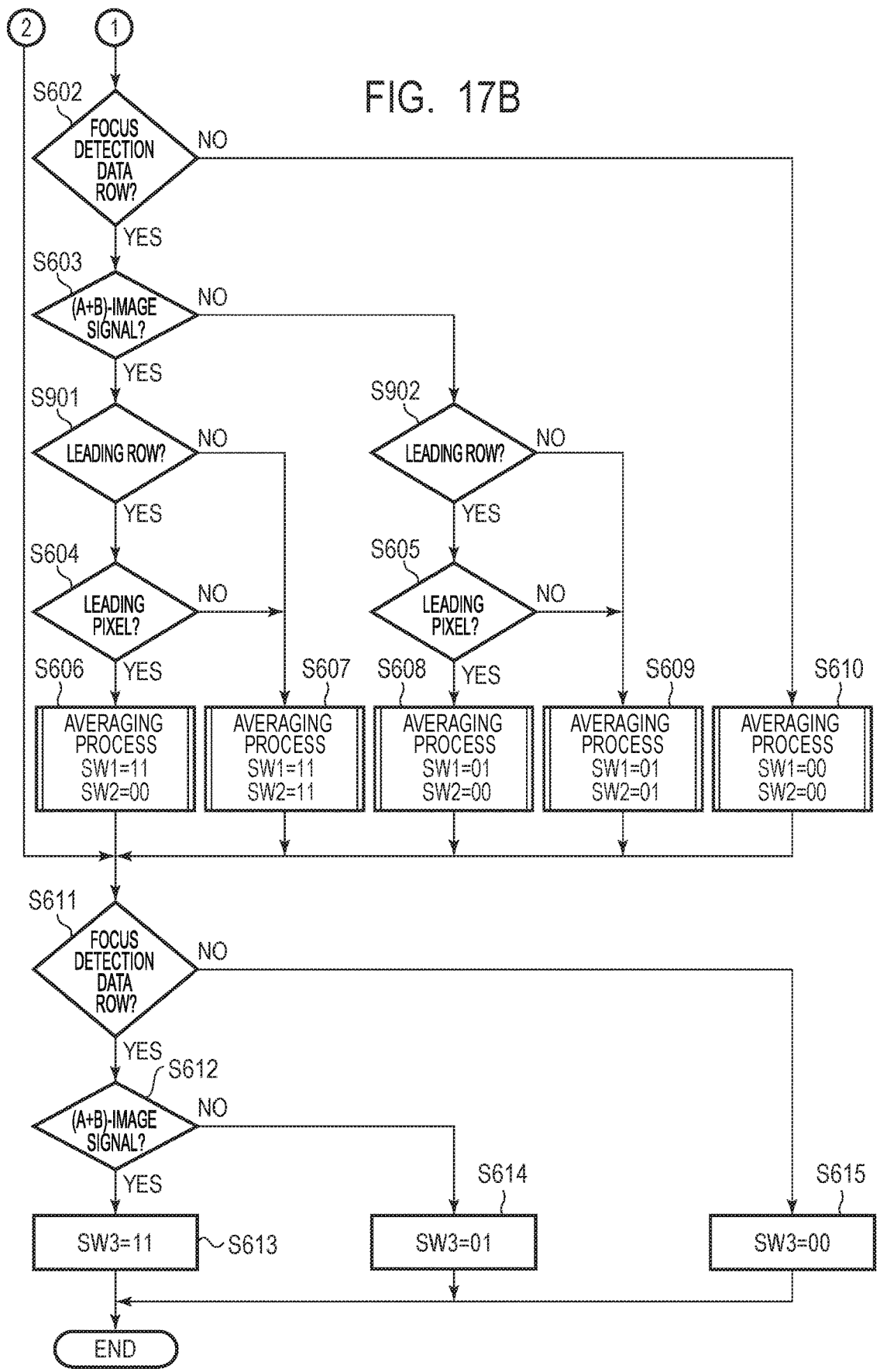

IMAGING DEVICE AND SIGNAL PROCESSING DEVICE

BACKGROUND OF THE INVENTION

Field of the Invention

The present invention relates to an imaging device and a signal processing device.

Description of the Related Art

In recent years, an imaging device mounted on an imaging system such as a digital still camera or a digital video camera has become more multifunctional. As one example, an imaging device that can output focus detection data in addition to captured image data is widely known. Japanese Patent Application Laid-Open No. 2017-098931 discloses a technique used for generating a black level correction value when output data includes multiple types of data groups such as focus detection data and captured image data.

In Japanese Patent Application Laid-Open No. 2017-098931, the black level correction value is independently generated for each of focus detection data and captured image data. However, when the focus detection data is discretely read out while the captured image data is output, for example, the black level correction value of the focus detection data may no longer follow shading. It is therefore difficult to obtain a good image even when a black level correction value is generated on a data group basis.

SUMMARY OF THE INVENTION

The present invention intends to provide an imaging device that can suitably perform black level correction even when output data includes multiple types of data groups.

According to one aspect of the present invention, provided is an imaging device including a pixel unit in which a plurality of unit pixels each including a plurality of photoelectric converters are arranged in a matrix, and a signal processing unit that processes signals read out from the pixel unit, wherein the pixel unit includes a first reference pixel region including the unit pixels each driven in a first mode to read out a signal in accordance with a combined charge obtained by combining charges generated by the plurality of photoelectric converters, and a second reference pixel region including the unit pixels each driven in a second mode to read out signals, the number of which is greater than the number of the signal read out in the first mode, including at least a signal in accordance with charge generated by a part of the plurality of photoelectric converters and a signal in accordance with a combined charge obtained by combining charges generated by the plurality of photoelectric converters, and wherein the signal processing unit is configured to calculate a first correction value in accordance with an average value of a first data group read out from the first reference pixel region in the first mode and calculate a second correction value in accordance with an average value of a second data group read out from the second reference pixel region in the second mode by using the first correction value as an initial value.

Further, according to another aspect of the present invention, provided is a signal processing device including an input unit to which a first data group including a plurality of captured image data and a second data group including a plurality of focus detection data are input, and a processing unit that processes the first data group and the second data group input to the input unit, wherein the processing unit is configured to calculate a first correction value in accordance with an average value of the first data group and calculate a second correction value in accordance with an average value of the second data group by using the first correction value as an initial value.

Further features of the present invention will become apparent from the following description of exemplary embodiments with reference to the attached drawings.

BRIEF DESCRIPTION OF THE DRAWINGS

FIG. 15 and FIG. 16 are timing charts illustrating a method of driving a unit pixel in an imaging device according to a fourth embodiment of the present invention.

FIG. 17A and FIG. 17B are flowcharts illustrating a method of generating a clamp value in an imaging device according to a fifth embodiment of the present invention.

DESCRIPTION OF THE EMBODIMENTS

First Embodiment

An imaging device and a method of driving the same according to a first embodiment of the present invention will be described with reference to FIG. 1 to FIG. 7, FIG. 20A, and FIG. 20B.

Figure 1:
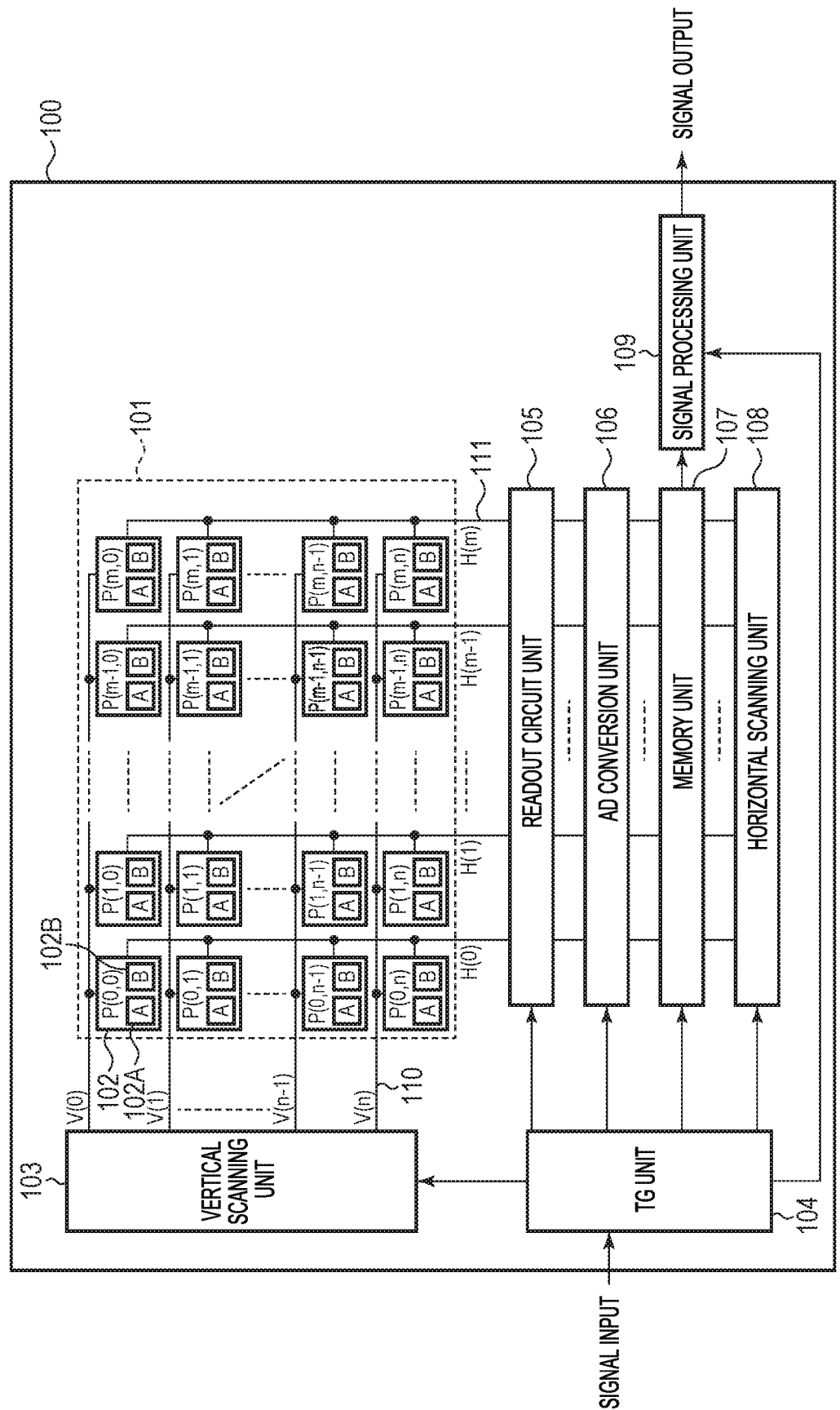
FIG. 1 is a block diagram illustrating a general configuration of an imaging device according to a first embodiment of the present invention.
Figure 2:
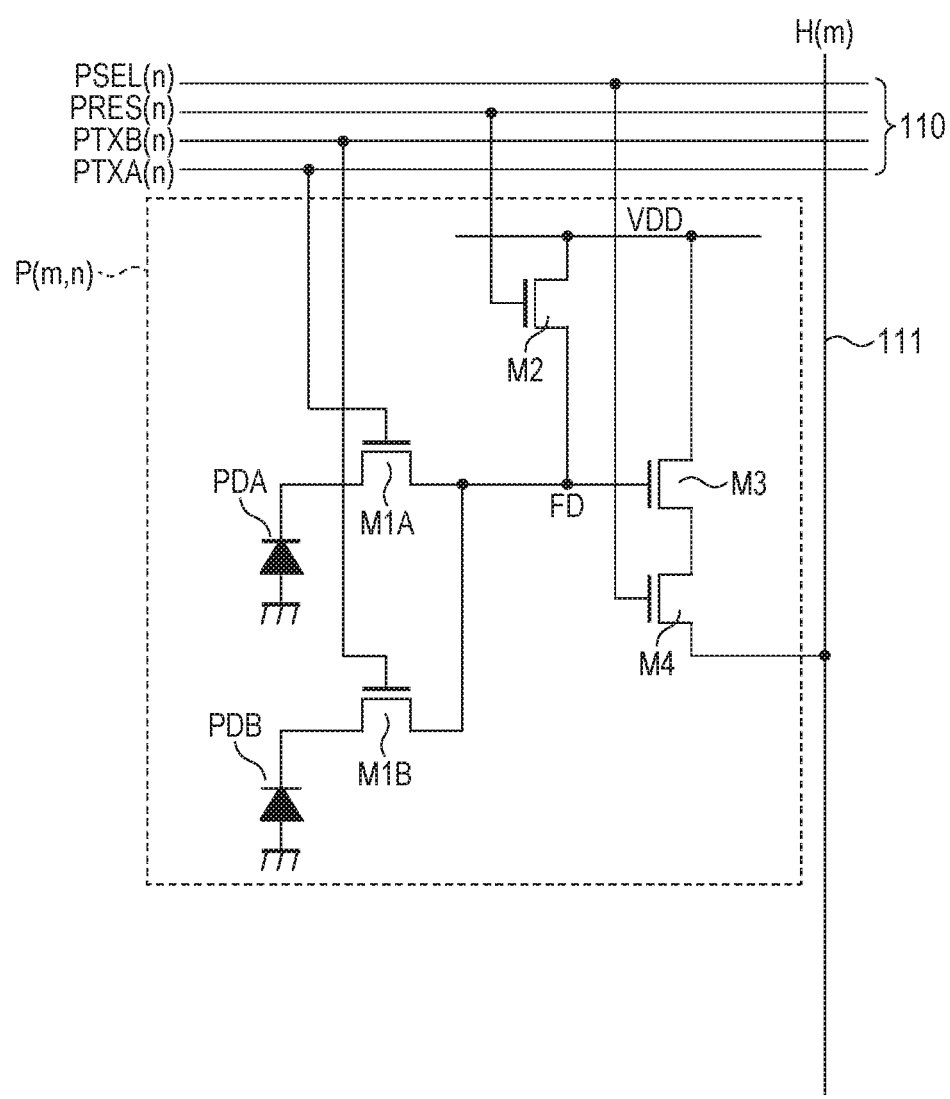
FIG. 2 is a circuit diagram illustrating a configuration example of a unit pixel of the imaging device according to the first embodiment of the present invention.

First, the structure of the imaging device according to the present embodiment will be described with reference to FIG. 1 and FIG. 2. FIG. 1 is a block diagram illustrating a general configuration of the imaging device according to the present embodiment. FIG. 2 is a circuit diagram illustrating a configuration example of a pixel of the imaging device according to the present embodiment.

As illustrated in FIG. 1, an imaging device 100 according to the present embodiment includes a pixel unit 101, a vertical scanning unit 103, a timing generator (TG) unit 104, a readout circuit unit 105, an analog-to-digital (AD) converter unit 106, a memory unit 107, a horizontal scanning unit 108, and a signal processing unit 109.

The pixel unit 101 includes a plurality of unit pixels 102 arranged in a matrix over a plurality of rows and a plurality of columns. FIG. 1 illustrates the pixel unit 101 including the unit pixels 102 arranged on (m+1) columns by (n+1) rows from the 0-th column to the m-th column and from the 0-th row to the n-th row. In each of the unit pixels 102, a reference symbol P(m, n), that is, a reference symbol P provided with coordinates indicating a corresponding column number and a corresponding row number is denoted. Each of the unit pixels 102 includes two photoelectric converters 102A and 102B. The imaging device 100 of the present embodiment can compare a signal output from the photoelectric converter 102A with a signal output from the photoelectric converter 102B to detect a phase difference.

A row select line 110 is arranged on each row of the pixel unit 101. Each of the row select lines 110 is connected to (m+1) unit pixels 102 arranged on a corresponding row. The row select lines 110 are connected to the vertical scanning unit 103.

A vertical output line 111 is arranged on each column of the pixel unit 101. Each of the vertical output lines 111 is connected to the (n+1) unit pixels 102 arranged on a corresponding column. The vertical output lines 111 are connected to the readout circuit unit 105.

The vertical scanning unit 103 is a control circuit unit for performing an operation (vertical scan) to provide drive signals to the unit pixels 102 of the pixel unit 101 on a row basis. On the row selected by the vertical scanning unit 103, pixel signals are output from the (m+1) unit pixels 102 included in the row via the vertical output lines 111 on the corresponding columns at the same time. The pixel signals (analog pixel signals) output on a row basis from the pixel unit 101 in such a way are input to the readout circuit unit 105.

The readout circuit unit 105 is a circuit unit that performs a predetermined process on an analog pixel signal on each column read out from the pixel unit 101. The readout circuit unit 105 may include a plurality of amplifier circuits or a plurality of signal holding circuits corresponding to respective columns of the pixel unit 101. For example, the readout circuit unit 105 amplifies the analog pixel signal output from the vertical output line 111 on each column of the pixel unit 101 by using an amplifier circuit on a corresponding column and holds the amplified analog pixel signal in a signal holding circuit on a corresponding column.

The AD converter unit 106 is a circuit unit that converts the analog pixel signal on each column output from the readout circuit unit 105 from an analog signal into a digital signal. The memory unit 107 is a signal holding circuit that temporarily holds the digital pixel signal on each column digitally converted in the AD converter unit 106.

The horizontal scanning unit 108 is a circuit unit that supplies, to the memory unit 107, a control signal used for outputting the digital pixel signal stored in a column memory on each column of the memory unit 107 to the signal processing unit 109. That is, the digital pixel signals stored in the column memories on columns addressed by the horizontal scanning unit 108 are sequentially read out from the memory unit 107 and are transferred to the signal processing unit 109.

The signal processing unit 109 performs predetermined processing on the digital pixel signal read out from the memory unit 107. The process performed by the signal processing unit 109 includes digital correlated double sampling (CDS), a correction process described later, or the like. Further, the signal processing unit 109 includes an external interface such as a low voltage differential signaling (LVDS) and outputs the processed digital pixel signal to the outside of the imaging device 100.

The TG unit 104 is a control unit used for supplying, to the vertical scanning unit 103, the readout circuit unit 105, the AD converter unit 106, the memory unit 107, the horizontal scanning unit 108, and the signal processing unit 109, control signals that control the operations of the above or the timings thereof. At least some of the control signals may be supplied from the outside of the imaging device 100. Further, to the TG unit 104, setting information on the imaging device 100 can be provided by external communication. In such a case, the TG unit 104 controls the vertical scanning unit 103, the readout circuit unit 105, the AD converter unit 106, the memory unit 107, the horizontal scanning unit 108, and the signal processing unit 109 based on the setting information externally input.

Here, a signal obtained from the photoelectric converter 102A, that is, a signal in accordance with charge generated by the photoelectric converter 102A is defined as an A-image signal. Further, a signal obtained from the photoelectric converter 102B, that is, a signal in accordance with charge generated by the photoelectric converter 102B is defined as a B-image signal. The A-image signal and the B-image signal can be used as signals used for focus detection. Further, a signal obtained by combining the A-image signal and the B-image signal, that is, a signal in accordance with combined charge obtained by combining charge generated by the photoelectric converter 102A and charge generated by the photoelectric converter 102B is defined as an (A+B)-image signal. The (A+B)-image signal can be used as a signal used for a captured image.

Further, out of the plurality of rows forming the pixel unit 101, a row including the unit pixels 102 from which the A-image signal and the (A+B)-image signal are read out is referred to as a focus detection data row. Further, out of the plurality of rows forming the pixel unit 101, a row on which only the (A+B)-image signal is read out from the unit pixels 102 is referred to as a captured image data row. In the imaging device 100 according to the present embodiment, the focus detection data row and the captured image data row are appropriately set in the pixel unit 101.

Each of the unit pixels 102 may be formed of a circuit illustrated in FIG. 2, for example. That is, as illustrated in FIG. 2, each of unit pixels 102 may include photodiodes PDA and PDB, transfer transistors M1A and M1B, a reset transistor M2, an amplifier transistor M3, and a select transistor M4.

The photodiodes PDA and PDB correspond to the photoelectric converters 102A and 102B described above. The photodiodes PDA and PDB of one unit pixel 102 share a single micro-lens (not illustrated) and are configured so as to receive a light that has passed through different pupil regions of an exit pupil of an imaging lens. Thereby, a signal based on charge generated by the photodiode PDA and a signal based on charge generated by the photodiode PDB can be used as signals used for focal distance detection. Further, a signal based on total charge obtained by adding charge generated by the photodiode PDA and charge generated by the photodiode PDB can be used as a signal used for image acquisition.

The photodiode PDA has the anode connected to a ground node (GND) and the cathode connected to the source of the transfer transistor M1A. The photodiode PDB has the anode connected to a ground node (GND) and the cathode connected to the source of the transfer transistor M1B. The drains of the transfer transistors M1A and M1B are connected to the source of the reset transistor M2 and the gate of the amplifier transistor M3. The connection node of the drains of the transfer transistors M1A and M1B, the source of the reset transistor M2, and the gate of the amplifier transistor M3 is a so-called floating diffusion FD. The floating diffusion FD includes a capacitance component, has a function as a charge holding portion, and forms a charge-to-voltage conversion unit formed of the capacitance component. The drain of the reset transistor M2 and the drain of the amplifier transistor M3 are connected to a power supply node (voltage VDD). The source of the amplifier transistor M3 is connected to the drain of the select transistor M4. The source of the select transistor M4 is connected to the vertical output line 111. Note that names of source and drain of each transistor may differ in accordance with the conductivity type of the transistor, the focused function of the transistor, or the like, and the names of source and drain described above may be opposite.

The row select line 110 on each row includes a signal line connected to the gate of the transfer transistor M1A, a signal line connected to the gate of the transfer transistor M1B, a signal line connected to the gate of the reset transistor M2, and a signal line connected to the gate of the select transistor M4. A control signal PTXA is supplied from the vertical scanning unit 103 to the signal line connected to the gate of the transfer transistor M1A. A control signal PTXB is supplied from the vertical scanning unit 103 to the signal line connected to the gate of the transfer transistor M1B. A control signal PRES is supplied from the vertical scanning unit 103 to the signal line connected to the gate of the reset transistor M2. A control signal PSEL is supplied from the vertical scanning unit 103 to the signal line connected to the gate of the select transistor M4. When each transistor is formed of an n-channel transistor, the corresponding transistor is in an on-state when a High-level control signal is supplied from the vertical scanning unit 103, and the corresponding transistor is in an off-state when a Low-level control signal is supplied from the vertical scanning unit 103.

When a light enters the pixel unit 101, the photodiodes PDA and PDB of each unit pixel 102 convert (photoelectrically convert) the incident light to an amount of charge in accordance with the light amount of the incident light and accumulate the generated charge. When turned on, the transfer transistors M1A and M1B transfer charges of the photodiodes PDA and PDB to the floating diffusion FD. The floating diffusion FD holds charges transferred from the photodiodes PDA and PDB. When the A-image signal is read out, only charge photoelectrically converted in the photodiode PDA is transferred to the floating diffusion FD via the transfer transistor M1A. When the B-image signal is read out, only charge photoelectrically converted in the photodiode PDB is transferred to the floating diffusion FD via the transfer transistor M1B. When the (A+B)-image signal is read out, total charge photoelectrically converted in the photodiodes PDA and PDB is transferred to the floating diffusion FD via the transfer transistors M1A and M1B. In such a way, the floating diffusion FD has a voltage in accordance with the amount of charge transferred from the photodiodes PDA and PDB by charge-to-voltage conversion caused by the capacitance component of the floating diffusion FD.

The amplifier transistor M3 is configured such that the voltage VDD is supplied to the drain and a bias current is supplied to the source from the current source (not illustrated) via the select transistor M4 and forms an amplifier unit in which the gate is the input node (source follower circuit). Thereby, the amplifier transistor M3 outputs a signal based on the voltage of the floating diffusion FD to the vertical output line 111 via the select transistor M4. When turned on, the reset transistor M2 resets the floating diffusion FD to a voltage corresponding to the voltage VDD.

The transfer transistors M1A and M1B, the reset transistor M2, and the select transistor M4 in the unit pixels 102 are controlled by the control signals PTXA, PTXB, PRES, and PSEL supplied from the vertical scanning unit 103 on a row basis. Pixel signals of the plurality of unit pixels 102 belonging to the row selected by the control signal PSEL (selected row) are output to the vertical output line 111 on respective columns at the same time.

Figure 3:
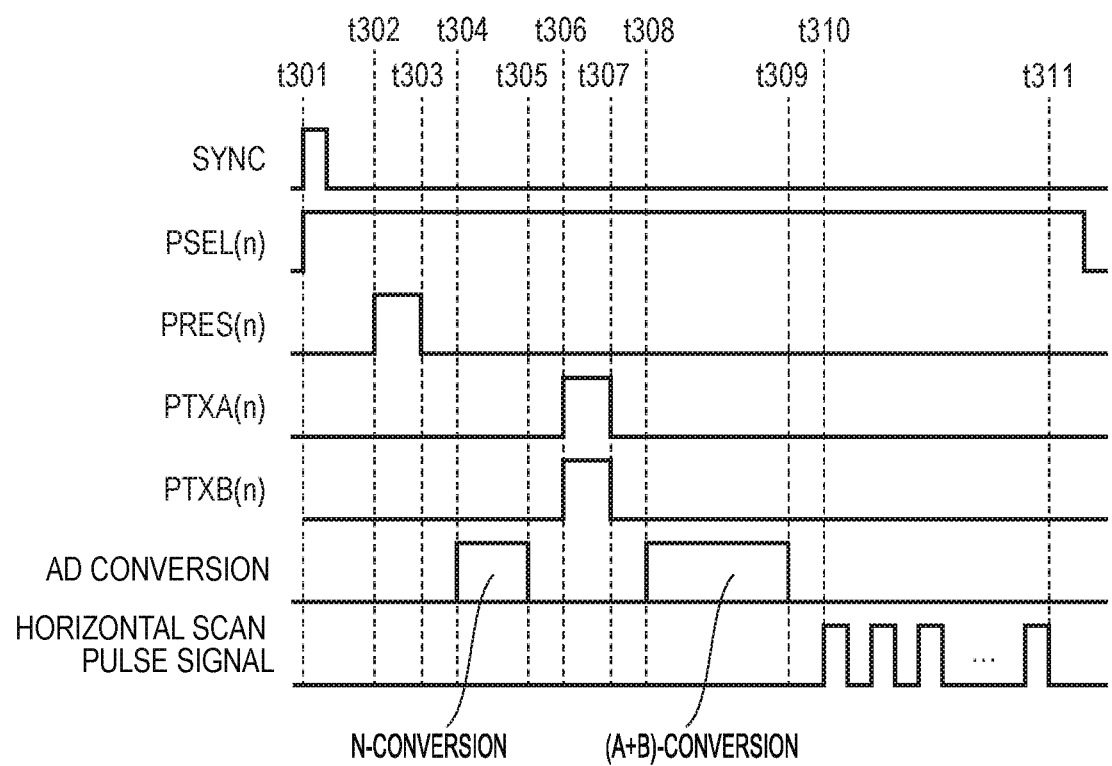
FIG. 3 and FIG. 4 are timing charts illustrating a method of driving a unit pixel in the imaging device according to the first embodiment of the present invention.
Figure 4:
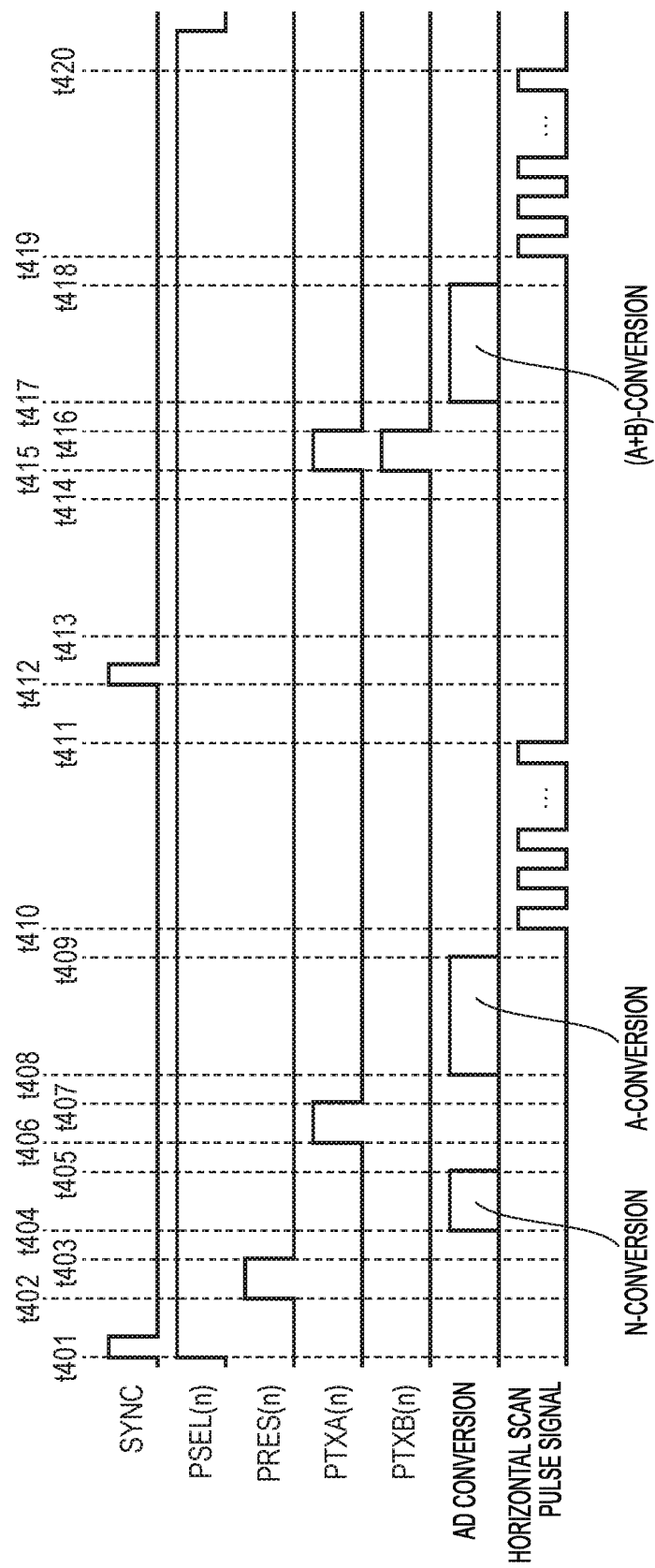
Figure 5:
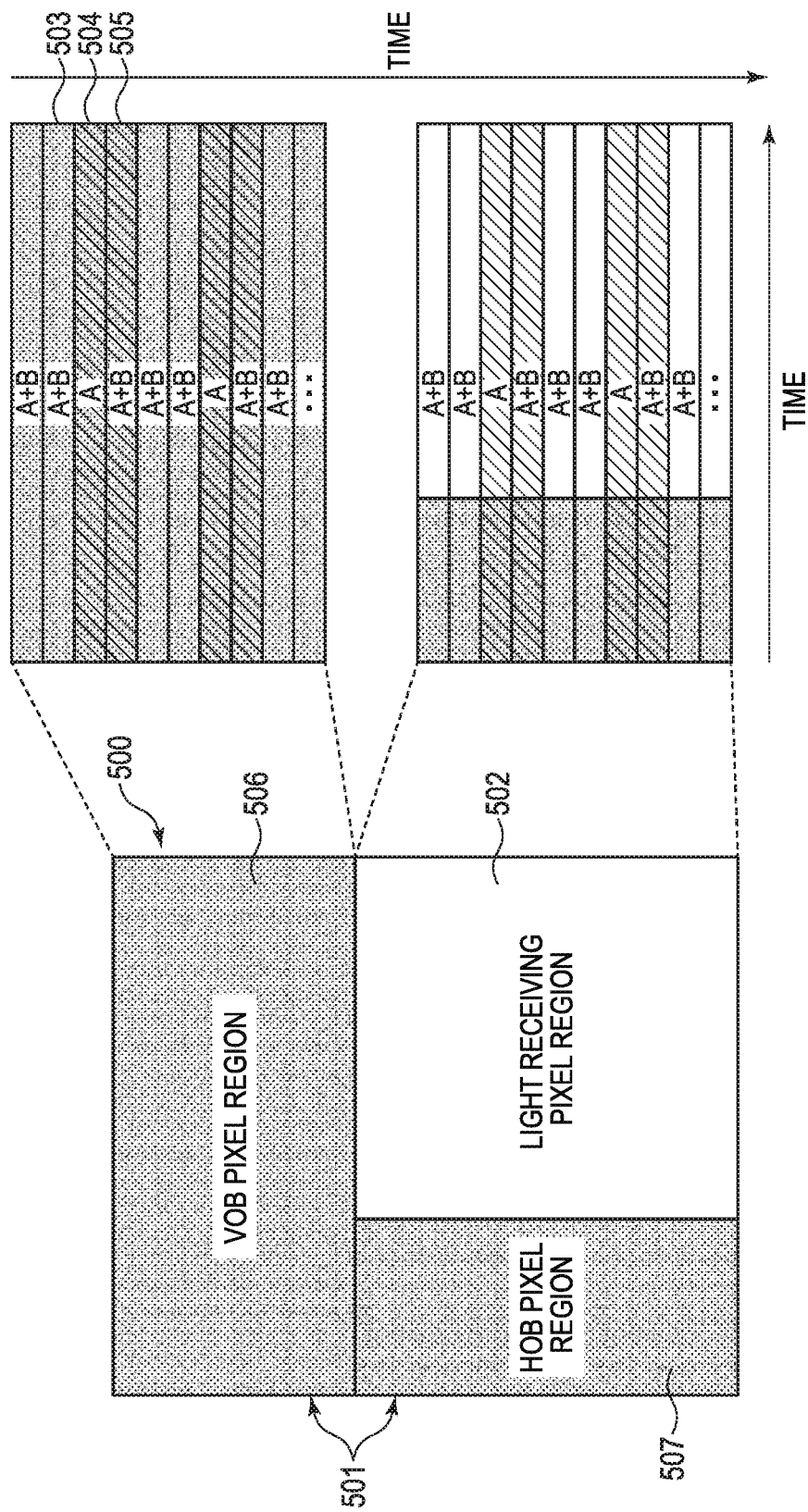
FIG. 5A and FIG. 5B are conceptual diagrams of an output signal in the imaging device according to the first embodiment of the present invention.

Next, the operation of the pixel unit 101 of the imaging device according to the present embodiment will be described with reference to FIG. 3 and FIG. 4. FIG. 3 is a timing chart when pixel signals are read out from the unit pixels 102 belonging to a captured image data row. FIG. 4 is a timing chart when pixel signals are read out from the unit pixels 102 belonging to a focus detection data row. FIG. 3 and FIG. 4 illustrate a readout operation when the unit pixels 102 on the n-th row are selected by the vertical scanning unit 103 as one example. Note that each transistor of the unit pixel 102 is turned on when a High-level control signal is supplied from the vertical scanning unit 103 and turned off when a Low-level control signal is supplied from the vertical scanning unit 103.

First, the readout operation for a captured image data row will be described with reference to FIG. 3. FIG. 3 illustrates a horizontal synchronization signal SYNC, control signals PSEL(n), PRES(n), PTXA(n), and PTXB(n), an AD conversion period, and a horizontal scan pulse signal.

Readout of data from the captured image data row is performed in a drive mode to read out only a signal in accordance with combined charge obtained by combining charges generated by the photodiodes PDA and PDB.

At time t301, the horizontal synchronization signal SYNC supplied from the TG unit 104 to the vertical scanning unit 103 transitions from the Low level to the High level. In response to this rising edge of the horizontal synchronization signal SYNC, the vertical scanning unit 103 controls the control signal PSEL(n) on the n-th row from the Low level to the High level. Thereby, in each of the unit pixels 102 belonging to the n-th row, the select transistor M4 is turned on, and a pixel signal is ready to be output to the vertical output line 111 via the select transistor M4. That is, the n-th row is selected by the control signal PSEL(n) from the vertical scanning unit 103.

At subsequent time t302, the vertical scanning unit 103 controls the control signal PRES(n) on the selected row, that is, the n-th row from the Low level to the High level. Thereby, in each of the unit pixels 102 belonging to the n-th row, the reset transistor M2 is turned on, and the floating diffusion FD is reset to the potential in accordance with the voltage VDD.

At subsequent time t303, the vertical scanning unit 103 controls the control signal PRES(n) on the n-th row from the High level to the Low level. Thereby, in each of the unit pixels 102 belonging to the n-th row, the reset transistor M2 is turned off, and the reset of the floating diffusion FD is cancelled. At this time, since each of the select transistors M4 of the unit pixels 102 belonging to the n-th row is still in the on-state, an output signal in accordance with the potential of the gate of the amplifier transistor M3 at cancellation of the reset of the floating diffusion FD is output to the vertical output line 111. A pixel signal at a reset level output from the unit pixel 102 in such a way will be referred to as a noise signal (N-signal).

The subsequent period from time t304 to time t305 is a period in which an AD conversion process is performed on the N-signal output to the vertical output line 111. The N-signal output to the vertical output line 111 is read out to the readout circuit unit 105 and converted into a digital signal at the AD converter unit 106. The digital signal of the N-signal obtained by the AD converter unit 106 is held in the memory unit 107. The operation performed from time t304 to time t305, that is, the operation to convert an N-signal into a digital signal will be referred to as N-conversion.

At subsequent time t306, the vertical scanning unit 103 controls the control signals PTXA(n) and PTXB(n) on the n-th row from the Low level to the High level, respectively. Thereby, in each of the unit pixels 102 belonging to the n-th row, the transfer transistors M1A and M1B are turned on, and charges accumulated in the photodiodes PDA and PDB are transferred to the floating diffusion FD. Thereby, the potential of the floating diffusion FD, that is, the gate of the amplifier transistor M3 becomes the potential in accordance with the amount of charge transferred from the photodiodes PDA and PDB. At this time, since each of the select transistors M4 of the unit pixels 102 belonging to the n-th row is still in the on-state, an (A+B)-image signal, which is a pixel signal in accordance with the total amount of charge generated by the photodiodes PDA and PDB, is output to the vertical output line 111.

At subsequent time t307, the vertical scanning unit 103 controls the control signals PTXA(n) and PTXB(n) on the n-th row from the High level to the Low level, respectively. Thereby, the transfer transistors M1A and M1B of each of the unit pixels 102 belonging to the n-th row are turned off.

The (A+B)-image signal continues to be output to the vertical output line 111 even after the transfer transistors M1A and M1B are turned off.

The subsequent period from time t308 to time t309 is a period in which an AD conversion process is performed on the (A+B)-image signal output to the vertical output line 111. The (A+B)-image signal output to the vertical output line 111 is read out to the readout circuit unit 105 and converted into a digital signal at the AD converter unit 106. The digital signal of the (A+B)-image signal obtained by the AD converter unit 106 is held in a different memory of the memory unit 107 from the memory in which the N-signal is held. The operation performed from time t308 to time t309, that is, the operation to convert an (A+B)-image signal into a digital signal will be referred to as (A+B)-conversion.

The subsequent period from time t310 to time t311 is a period in which the N-signal and the (A+B)-image signal held in the memory unit 107 are transferred to the signal processing unit 109. The horizontal scanning unit 108 outputs a horizontal scan pulse signal to the memory unit 107. The memory unit 107 transfers the N-signal and the (A+B)-image signal corresponding to an address (column) selected by the horizontal scan pulse signal to the signal processing unit 109. By repeatedly performing this operation (performing horizontal scan) from the 0-th column to the m-th column while changing the address selected by the horizontal scan plus signal, it is possible to read out the N-signal and the (A+B)-image signal for one row that is a row to be read out. The signal processing unit 109 performs a process of subtracting an N-signal corresponding to an (A+B)-image signal from the (A+B)-image signal and removes fixed pattern noise superimposed on the (A+B)-image signal.

The vertical scanning unit 103 then controls the control signal PSEL(n) on the n-th row from the High level to the Low level to cancel the selection of the n-th row, completes the readout operation for one row of the captured image data row, and proceeds to a readout operation on the next row.

Next, a readout operation for a focus detection data row will be described with reference to FIG. 4. FIG. 4 illustrates the horizontal synchronization signal SYNC, control signals PSEL(n), PRES(n), PTXA(n), and PTXB(n), an AD conversion period, and a horizontal scan pulse signal.

Readout of data from the focus detection data row is performed in a drive mode to read out a signal in accordance with charge generated by the photodiode PDA and a signal in accordance with combined charge obtained by combining charges generated by the photodiodes PDA and PDB.

At time t401, the horizontal synchronization signal SYNC supplied from the TG unit 104 to the vertical scanning unit 103 transitions from the Low level to the High level. In response to this rising edge of the horizontal synchronization signal SYNC, the vertical scanning unit 103 controls the control signal PSEL(n) on the n-th row from the Low level to the High level. Thereby, the select transistor M4 of each of the unit pixels 102 belonging to the n-th row is turned on, that is, the n-th row is selected.

At subsequent time t402, the vertical scanning unit 103 controls the control signal PRES(n) on the n-th row from the Low level to the High level. Thereby, in each of the unit pixels 102 belonging to the n-th row, the reset transistor M2 is turned on, and the floating diffusion FD is reset to the potential in accordance with the voltage VDD.

At subsequent time t403, the vertical scanning unit 103 controls the control signal PRES(n) on the n-th row from the High level to the Low level. Thereby, in each of the unit pixels 102 belonging to the n-th row, the reset transistor M2 is turned off, and the reset of the floating diffusion FD is cancelled. At this time, since each of the select transistors M4 of the unit pixels 102 belonging to the n-th row is still in the on-state, a pixel signal (N-signal) at the reset level is output to the vertical output line 111.

The subsequent period from time t404 to time t405 is a period in which an AD conversion process (N-conversion) is performed on the N-signal output to the vertical output line 111. The N-signal output to the vertical output line 111 is read out to the readout circuit unit 105 and converted into a digital signal at the AD converter unit 106. The digital signal of the N-signal obtained by the AD converter unit 106 is held in the memory unit 107.

At subsequent time t406, the vertical scanning unit 103 controls the control signal PTXA(n) on the n-th row from the Low level to the High level. Thereby, in each of the unit pixels 102 belonging to the n-th row, the transfer transistor M1A is turned on, and charge accumulated in the photodiode PDA is transferred to the floating diffusion FD. Thereby, the potential of the floating diffusion FD, that is, the gate of the amplifier transistor M3 becomes the potential in accordance with the amount of charge transferred from the photodiode PDA. At this time, since each of the select transistors M4 of the unit pixels 102 belonging to the n-th row is still in the on-state, an A-image signal, which is a pixel signal in accordance with the amount of charge generated by the photodiode PDA, is output to the vertical output line 111.

At subsequent time t407, the vertical scanning unit 103 controls the control signal PTXA(n) on the n-th row from the High level to the Low level. Thereby, the transfer transistor M1A of each of the unit pixels 102 belonging to the n-th row are turned off. The A-image signal continues to be output to the vertical output line 111 even after the transfer transistor M1A is turned off.

The subsequent period from time t408 to time t409 is a period in which an AD conversion process is performed on the A-image signal output to the vertical output line 111. The A-image signal output to the vertical output line 111 is read out to the readout circuit unit 105 and converted into a digital signal at the AD converter unit 106. The digital signal of the A-image signal obtained by the AD converter unit 106 is held in a different memory of the memory unit 107 from the memory in which the N-signal is held. The operation performed from time t408 to time t409, that is, the operation to convert an N-image signal into a digital signal will be referred to as A-conversion.

The subsequent period from time t410 to time t411 is a period in which the N-signal and the A-image signal held in the memory unit 107 are transferred to the signal processing unit 109. The horizontal scanning unit 108 outputs a horizontal scan pulse signal to the memory unit 107. The memory unit 107 transfers the N-signal and the A-image signal corresponding to an address (column) selected by the horizontal scan pulse signal to the signal processing unit 109. By repeatedly performing this operation (performing horizontal scan) from the 0-th column to the m-th column while changing the address selected by the horizontal scan plus signal, it is possible to read out the N-signal and the A-image signal for one row that is a row to be read out.

At subsequent time t412, the horizontal synchronization signal SYNC supplied from the TG unit 104 to the vertical scanning unit 103 again transitions from the Low level to the High level. At this time, each of the select transistors M4 of the unit pixels 102 belonging to the n-th row is still in the on-state, and a state where the n-th row is selected is maintained.

In the subsequent period from time t413 to time t414, the vertical scanning unit 103 maintains the control signal PRES(n) on the n-th row at the Low level. That is, in the period from time t413 to time t414, neither reset of the floating diffusion FD nor N-conversion is performed. The floating diffusion FD is in a state where the charge transferred from the photodiode PDA during the period from time t406 to time t407 is held.

At subsequent time t415, the vertical scanning unit 103 controls the control signals PTXA(n) and PTXB(n) on the n-th row from the Low level to the High level. Thereby, in each of the unit pixels 102 belonging to the n-th row, the transfer transistors M1A and M1B are turned on, and charge accumulated in the photodiode PDB is transferred to the floating diffusion FD. Thereby, in the floating diffusion FD, charge transferred from the photodiode PDB is added to the charge transferred from the photodiode PDA. The potential of the floating diffusion FD, that is, the potential of the gate of the amplifier transistor M3 becomes the potential in accordance with the total amount of charge transferred from the photodiodes PDA and PDB. At this time, since each of the select transistors M4 of the unit pixels 102 belonging to the n-th row is still in the on-state, the (A+B)-image signal, which is a pixel signal in accordance with the total amount of charge generated by the photodiodes PDA and PDB, is output to the vertical output line 111.

At subsequent time t416, the vertical scanning unit 103 controls the control signals PTXA(n) and PTXB(n) on the n-th row from the High level to the Low level. Thereby, the transfer transistors M1A and M1B of each of the unit pixels 102 belonging to the n-th row are turned off. The (A+B)-image signal continues to be output to the vertical output line 111 even after the transfer transistors M1A and M1B are turned off.

The subsequent period from time t417 to time t418 is a period in which an AD conversion process ((A+B)-conversion) is performed on the (A+B)-image signal output to the vertical output line 111. The (A+B)-image signal output to the vertical output line 111 is read out to the readout circuit unit 105 and converted into a digital signal at the AD converter unit 106. The digital signal of the (A+B)-image signal obtained by the AD converter unit 106 is held in the same memory of the memory unit 107 as the memory that has held the A-image signal.

The subsequent period from time t419 to time t420 is a period in which the N-signal and the (A+B)-image signal held in the memory unit 107 are transferred to the signal processing unit 109. The horizontal scanning unit 108 outputs a horizontal scan pulse signal to the memory unit 107. The memory unit 107 transfers the N-signal and the (A+B)-image signal corresponding to an address (column) selected by the horizontal scan pulse signal to the signal processing unit 109. By repeatedly performing this operation (performing horizontal scan) from the 0-th column to the m-th column while changing the address selected by the horizontal scan plus signal, it is possible to read out the N-signal and the (A+B)-image signal for one row that is a row to be read out.

In such a way, an A-image signal, an N-signal corresponding to the A-image signal, an (A+B)-image signal, and an N-signal corresponding to the (A+B)-image signal for one row of the row to be read out can be read out.

The signal processing unit 109 performs a process of subtracting an N-signal corresponding to an A-image signal from the A-image signal and removes fixed pattern noise superimposed on the A-image signal. Further, the signal processing unit 109 performs a process of subtracting an N-signal corresponding to an (A+B)-image signal from the (A+B)-image signal and removes fixed pattern noise superimposed on the (A+B)-image signal. By subtracting an A-image signal from an (A+B)-image signal, it is possible to obtain a B-image signal required for performing focus detection.

The vertical scanning unit 103 then controls the control signal PSEL(n) on the n-th row from the High level to the Low level to cancel the selection of the n-th row, completes the readout operation for one row of the focus detection data row, and proceeds to a readout operation on the next row.

When pixel signals are read out from the unit pixels 102 on a captured image data row, the (A+B)-image signal is read out as illustrated in FIG. 3. On the other hand, when pixel signals are read out from the unit pixels 102 on a focus detection data row, the A-image signal and the (A+B)-image signal are read out from the same row as illustrated in FIG. 4. Thus, according to the drive method described above, a readout period can be shortened compared to a case where the A-image signal and the B-image signal are read out from all the rows forming the pixel unit 101.

FIG. 5A and FIG. 5B are diagrams conceptually illustrating a readout operation in the imaging device of the present embodiment. FIG. 5A illustrates a configuration example of a pixel array 500 arranged in the pixel unit 101. FIG. 5B is a conceptual diagram in which signals output from the imaging device 100 are arranged from the left in the output order while each new row is started based on the horizontal synchronization signal SYNC as a reference. The width in the horizontal direction in FIG. 5B corresponds to the length of one horizontal period defined by the interval of the horizontal synchronization signal SYNC.

The plurality of unit pixels 102 forming the pixel unit 101 form the pixel array 500 including light receiving pixels in which the photodiodes PDA and PDB are not shielded form light and optical black (OB) pixels in which the photodiodes PDA and PDB are shielded form light. In the pixel array 500, the region in which the light receiving pixels are arranged is a light receiving pixel region 502, and a region in which the OB pixels are arranged is a reference pixel region (also referred to as an OB pixel region) 501. In FIG. 5A and FIG. 5B, for easier visual distinction between the reference pixel region 501 and the light receiving pixel region 502, dot patterns are provided on the reference pixel region 501. Any region may be set for the reference pixel region 501, and the set region can be used for generation of a correction value (clamp value) used in a correction process performed on output data of a light receiving pixel. Such a region will be referred to as a clamp value acquisition region.

Herein, in the reference pixel region 501, the region adjacent to the upper side of the pixel unit 101 is referred to as a VOB pixel region 506, and the region adjacent to the left side of the pixel unit 101 is referred to as an HOB pixel region 507. The VOB pixel region 506 is a region including OB pixels arranged on a different row of the light receiving pixel region 502 from a row on which a light receiving pixels are arranged. The HOB pixel region 507 is a region including OB pixels arranged on different columns on the same row of the light receiving pixel region 502 as the row on which light receiving pixels are arranged. In one example, the clamp value acquisition region is set on some of the rows of the VOB pixel region 506.

FIG. 5B illustrates the classification of pixel signals read out from the pixel array 500. In FIG. 5B, for easier visual distinction between data read out from the captured image data row and data read out from the focus detection data row, data read out from the focus detection data row is hatched. For example, from a certain captured image data row of the pixel array 500, the (A+B)-image signal is output during the horizontal period 503 in accordance with the timing chart of FIG. 3. Further, from a certain focus detection data row of the pixel array 500, the A-image signal is output during the horizontal period 504, and the (A+B)-image signal is output during the next horizontal period 505 in accordance with the timing chart of FIG. 4.

In such a way, in the readout operation of the imaging device according to the present embodiment, focus detection data is discretely output during the output of captured image data.

Next, signal processing performed in the signal processing unit 109 will be described. In the signal processing unit 109, first, a process of subtracting an N-signal corresponding to an (A+B)-image signal from the (A+B)-image signal is performed. Thereby, fixed pattern noise is removed from the (A+B)-image signal. Next, a process of subtracting a clamp value generated from output signals of the unit pixels 102 arranged in the reference pixel region 501 from the (A+B)-image signal from which fixed pattern noise has been removed is performed. This process is a correction process for adjusting the black level to a reference level.

Figure 6:
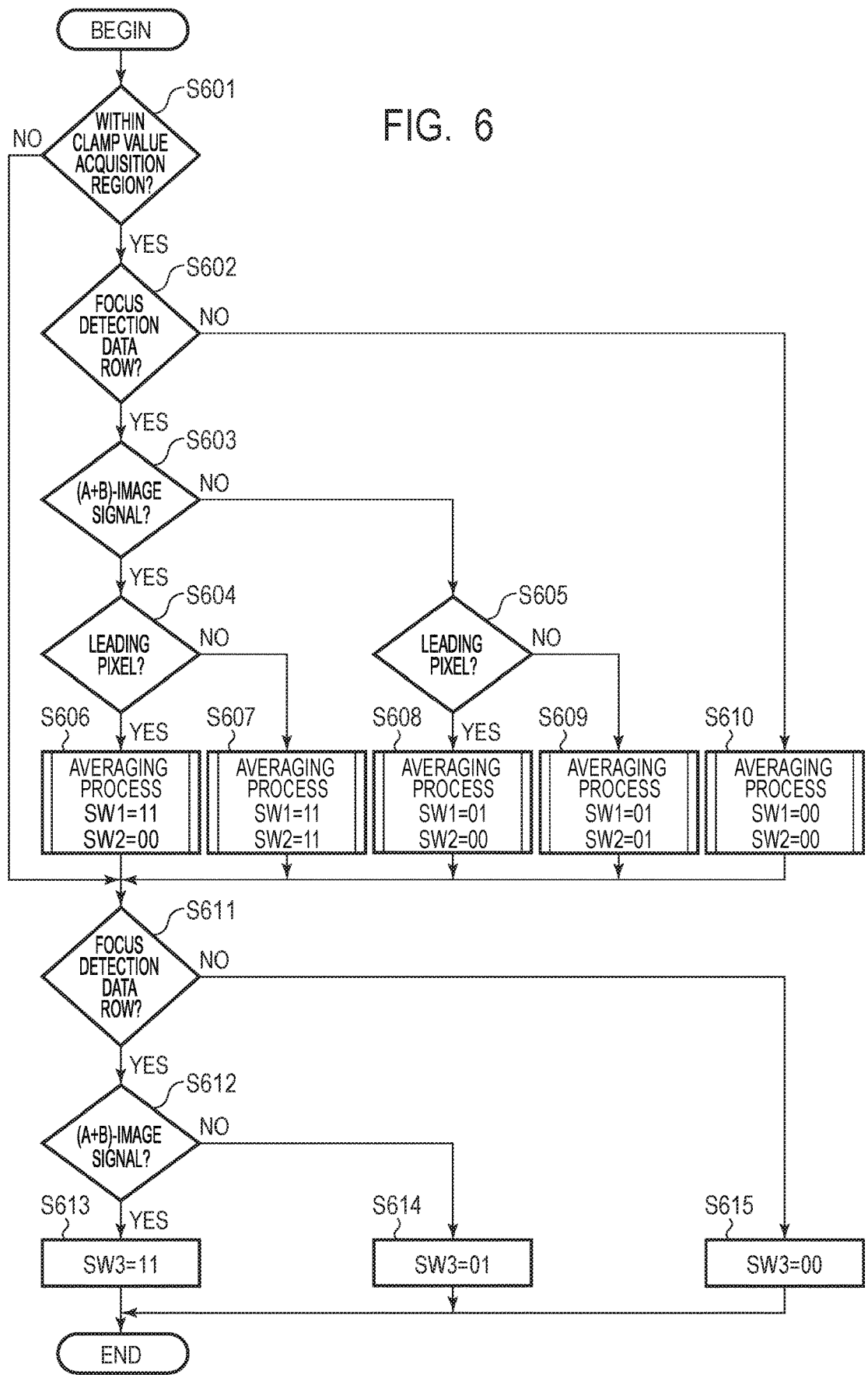
FIG. 6 is a flowchart illustrating a method of generating a clamp value in the imaging device according to the first embodiment of the present invention.

FIG. 6 is a flowchart illustrating a method of generating a clamp value in the imaging device of the present embodiment. When a clamp value is generated, data is loaded sequentially from a data group output from the pixel unit 101, and a process in accordance with the flowchart illustrated in FIG. 6 is performed on the data output from each of the unit pixels 102. The clamp value for each of the unit pixels 102 is generated in accordance with step S601 to step S615 illustrated in FIG. 6.

First, in step S601, it is determined whether or not the target data is data within the clamp value acquisition region. As a result of the determination, if the target data is data within the clamp value acquisition region (Yes), the process proceeds to step S602, and if the target data is not data within the clamp value acquisition region (No), the process proceeds to step S611.

In step S602, it is determined whether or not the target data is data of a focus detection data row. As a result of the determination, if the target data is data of a focus detection data row (Yes), the process proceeds to step S603, and if the target data is not data of a focus detection data row (No), the process proceeds to step S610.

In step S603, it is determined whether the target data is the (A+B)-image signal or the A-image signal of a focus detection data row. As a result of the determination, if the target data is the (A+B)-image signal of a focus detection data row (Yes), the process proceeds to step S604, and if the target data is the A-image signal of a focus detection data row (No), the process proceeds to step S605.

In step S604, it is determined whether or not the target data is the (A+B)-image signal of the leading pixel on a focus detection data row. Herein, the leading pixel means the first processed pixel on each row of the clamp value acquisition region. As a result of the determination, if the target data is the (A+B)-image signal of the leading pixel on a focus detection data row (Yes), the process proceeds to step S606, and if the target data is not the (A+B)-image signal of the leading pixel on a focus detection data row (No), the process proceeds to step S607.

In step S605, it is determined whether or not the target data is the A-image signal of the leading pixel on a focus detection data row. As a result of the determination, if the target data is the A-image signal of the leading pixel on a focus detection data row (Yes), the process proceeds to step S608, and if the target data is not the A-image signal of the leading pixel on a focus detection data row (No), the process proceeds to step S609.

Figure 7:
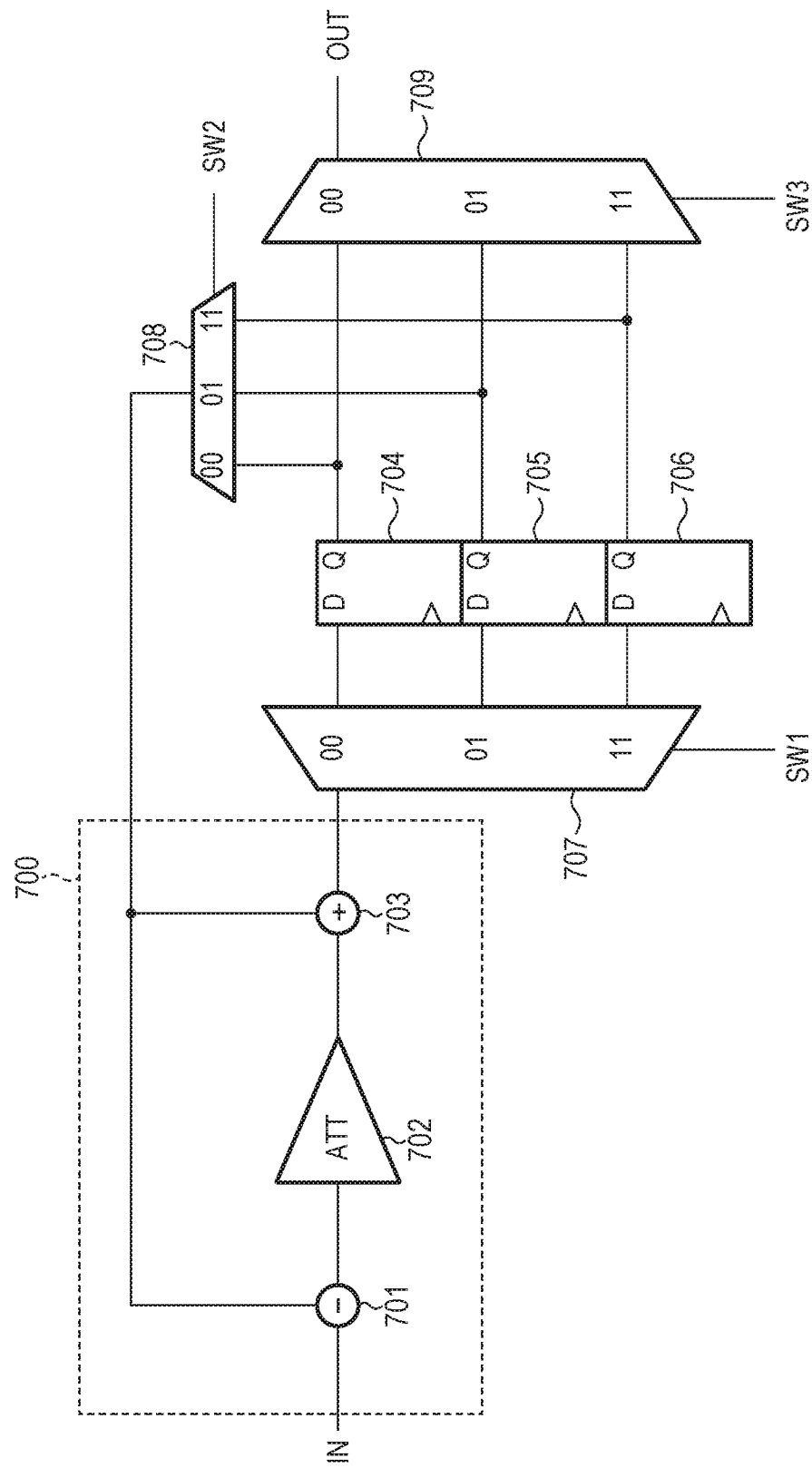
FIG. 7 is a block diagram illustrating a configuration example of an LPF circuit used for generating the clamp value in the imaging device according to the first embodiment of the present invention.

In steps S606 to S610, an averaging process in accordance with the type of target data is performed. For example, a low pass filter (LPF) circuit illustrated in FIG. 7 is used in the averaging process of target data. FIG. 7 is a block diagram illustrating a configuration example of the LPF circuit used for generation of a clamp value in the present embodiment.

As illustrated in FIG. 7, the LPF circuit used for generation of a clamp value in the present embodiment includes an averaging circuit 700, holding units 704, 705, and 706, and switches 707, 708, and 709. The averaging circuit 700 includes a subtractor unit 701, an attenuator unit 702, and an adder unit 703.

The averaging circuit 700 calculates a difference between input data and held data at the subtractor unit 701, attenuates the difference data in accordance with a predetermined feedback gain at the attenuator unit 702, adds the attenuated data and the held data at the adder unit 703, and holds the added data in the holding unit 704, 705, or 706. The averaging circuit 700 performs the above process every time data is input, and adds data of a difference from a target level, that is, the average value of the input data little by little to cause the held data to be gradually closer to the target level.

A transfer function for calculating a clamp value OBC(i) of the i-th row is as follow:

$$OBC(i)=OBC(i-1)+(\text{Darklevel}-OBC(i-1))\times ATT$$

where Darklevel denotes a reference black level acquired from the reference pixel region 501, and ATT denotes a feedback gain.

Each of the holding units 704, 705, and 706 is a holding unit used for holding a clamp value. Specifically, the holding unit 704 is a holding unit that holds a clamp value used for a captured image data row. The holding unit 705 is a holding unit that holds a clamp value used for the A-image signal of a focus detection data row. The holding unit 706 is a holding unit that holds a clamp value used for the (A+B)-image signal of a focus detection data row.

The switches 707, 708, and 709 are switches that select the holding unit 704, 705, or 706. Specifically, the switch 707 is a switch that switches the holding unit used for holding data processed by the averaging circuit 700 out of the holding units 704, 705, and 706. The switch 708 is a switch that switches the clamp value to be used as feedback data in performing an averaging process in the averaging circuit 700 out of the clamp values held in the holding units 704, 705, and 706. The switch 709 is a switch that switches data to be used as a clamp value out of data held in the holding units 704, 705, and 706.

The subtractor unit 701 calculates a difference between input data IN and the held data held in a holding unit selected by the switch 708 out of held data held by the holding units 704, 705, and 706 and outputs the difference data to the attenuator unit 702. The switch 708 selects any one of the holding units 704, 705, and 706 in accordance with the value of a control signal SW2. The attenuator unit 702 attenuates the difference data in accordance with a predetermined feedback gain and outputs the attenuated data to the adder unit 703. The adder unit 703 adds the attenuated data and the held data selected by the switch 708 and holds the added data as new held data in the holding unit selected by the switch 707 out of the holding units 704, 705, and 706. The switch 707 selects any one of the holding units 704, 705, and 706 in accordance with the value of a control signal SW1.

The switch 709 selects any one of the held data held by the holding units 704, 705, and 706 in accordance with the value of a control signal SW3 and outputs the selected held data as output data OUT. This output data OUT is a clamp value used for a correction process.

In step S610, the averaging process is performed on pixel data of the captured image data row with SW1=00 and SW2=00. That is, when the target data is data of a captured image data row of the clamp value acquisition region, the clamp value used for the captured image data row held in the holding unit 704 is used as feedback data to generate a clamp value and hold the clamp value in the holding unit 704. After the process of step S610, the process proceeds to step S611.

In step S606, the averaging process is performed on the (A+B)-image signal of the leading pixel on the focus detection data row with SW1=11 and SW2=00. That is, when the (A+B)-image signal of the leading pixel on a focus detection data row is processed, the clamp value used for the captured image data row held in the holding unit 704 is used as feedback data to generate a clamp value and hold the clamp value in the holding unit 706. That is, a clamp value used for a captured image data row is used as an initial value to generate a clamp value for the (A+B)-image signal. After the process of step S606, the process proceeds to step S611.

In step S607, the averaging process is performed on the (A+B)-image signal of a pixel other than the leading pixel on the focus detection data row with SW1=11 and SW2=11. That is, when an (A+B)-image signal of a pixel other than the leading pixel on a focus detection data row is processed, the clamp value used for the (A+B)-image signal of a focus detection data row held in the holding unit 706 is used as feedback data to generate a clamp value and hold the clamp value in the holding unit 706. After the process of step S607, the process proceeds to step S611.

In step S608, the averaging process is performed on the A-image signal of the leading pixel on the focus detection data row with SW1=01 and SW2=00. That is, when an A-image signal of the leading pixel on a focus detection data row is processed, the clamp value used for the captured image data row held in the holding unit 704 is used as feedback data to generate a clamp value and hold the clamp value in the holding unit 705. That is, a clamp value used for the captured image data row is used as an initial value to generate a clamp value for the A-image signal. After the process of step S608, the process proceeds to step S611.

In step S609, the averaging process is performed on the A-image signal of a pixel other than the leading pixel on the focus detection data row with SW1=01 and SW2=01. That is, when the A-image signal of a pixel other than the leading pixel on a focus detection data row is processed, the clamp value used for the A-image signal of the focus detection data row held in the holding unit 705 is used as feedback data to generate a clamp value and hold the clamp value in the holding unit 705. After the process of step S609, the process proceeds to step S611.

In step S611, it is determined whether or not the target data is data of a focus detection data row. As a result of the determination, if the target data is data of a focus detection data row (Yes), the process proceeds to step S612, and if the target data is not data of a focus detection data row (No), the process proceeds to step S615.

In step S612, it is determined whether the target data is the (A+B)-image signal or the A-image signal of the focus detection data row. As a result of the determination, if the target data is the (A+B)-image signal of the focus detection data row (Yes), the process proceeds to step S613, and if the target data is the A-image signal of the focus detection data row (No), the process proceeds to step S614.

In step S613, the holding unit 706 used for the (A+B)-image signal of the focus detection data row is connected to the output terminal of the LPF circuit with the control signal SW3 being set as SW3=11. That is, when a black level correction process is performed, the clamp value used for the (A+B)-image signal of the focus detection data row held in the holding unit 706 is used.

In step S614, the holding unit 705 used for the A-image signal of the focus detection data row is connected to the output terminal of the averaging circuit 700 with the control signal SW3 being set as SW3=01. That is, when a black level correction process is performed, the clamp value used for the A-image signal of the focus detection data row held in the holding unit 705 is used.

In step S615, the holding unit 704 used for the captured image data row is connected to the output terminal of the averaging circuit 700 with the control signal SW3 being set as SW3=00. That is, when a black level correction process is performed, the clamp value used for the captured image data row held in the holding unit 704 is used.

Figures 20A, 20B:
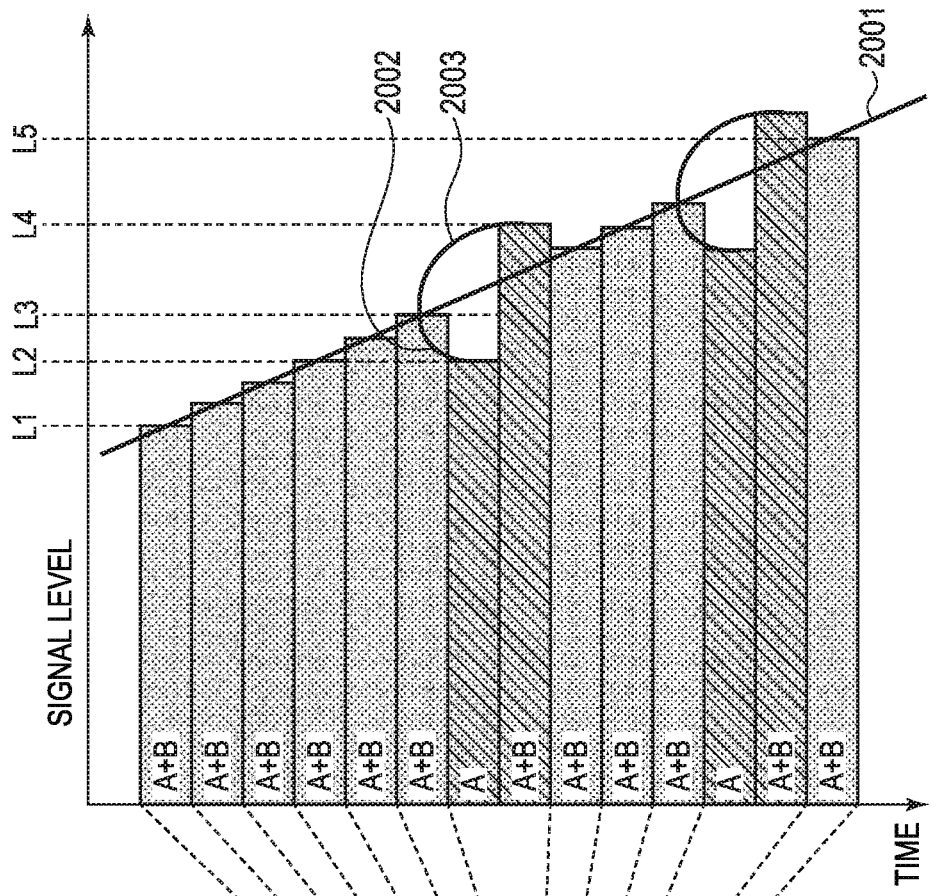
FIG. 20A and FIG. 20B are diagrams illustrating an advantageous effect of the imaging device according to the first embodiment of the present invention.

An advantageous effect of the imaging device according to the present embodiment will be described with reference to FIG. 20A and FIG. 20B. FIG. 20A and FIG. 20B are schematic diagram illustrating an advantageous effect of the imaging device according to the present embodiment. FIG. 20A is a schematic diagram in which some of the rows belonging to the VOB pixel region 506 is extracted. FIG. 20B illustrates signal levels on the rows corresponding to FIG. 20A. In FIG. 20B, the vertical axis represents time, and the horizontal axis represents the signal level.

In FIG. 20A and FIG. 20B, in the VOB pixel region 506, a case where shading occurs so that the reference black level increases in the vertical direction is assumed. For example, the reference black level of the captured image data row illustrated at the top of FIG. 20B is a signal level L1, and the reference black level of the captured image data row illustrated at the bottom of FIG. 20B is a signal level L5. The signal level difference between the signal level L1 and the signal level L5 indicates that shading occurs in the vertical direction.

As an application example of the present embodiment, a clamp value used for a captured image data row that follows shading in the vertical direction is represented by a straight line 2001 in FIG. 20B. With a use of the LPF circuit of the present embodiment, it is possible to cause the clamp value of the captured image data row to follow the shading in the vertical direction. This enables black level correction that follows shading in the vertical direction.

The signal level L3 represents a reference black level of the captured image data row for a different row from the row related to the signal levels L1 and L5. Further, the signal level L2 and the signal level L4 represent reference black levels of the A-image signal and the (A+B)-image signal of a focus detection data row of the VOB pixel region 506, respectively. In the VOB pixel region 506 illustrated in FIG. 20A and FIG. 20B, there is a level difference between the reference black level of the A-image signal and the (A+B)-image signal of the focus detection data row and the reference black level of the captured image data row because of a difference in the drive method. That is, the level difference between the signal level L3 and the signal level L2 and the level difference between the signal level L3 and the signal level L4 correspond to the above level difference.

As an application example of the present embodiment, FIG. 20B illustrates a clamp value 2002 used for the A-image signal of the focus detection data row and a clamp value 2003 used for the (A+B)-image signal of the focus detection data row. With a use of the LPF circuit of the present embodiment, the clamp value used for the captured image data row that already follows the shading in the vertical direction is used as a reference only for generation of a correction value of the leading pixel. For pixels other than the above, a clamp value used for the focus detection data row is used as a reference, and each clamp value is generated. This enables black level correction that follows not only shading in the vertical direction but also a level difference of respective focus detection data rows.

Therefore, according to the present embodiment, it is possible to suitably performs not only black level correction used for a captured image data row but also black level correction used for a focus detection data row, and an imaging device that can obtain a good image can be provided.

Second Embodiment

Figure 8:
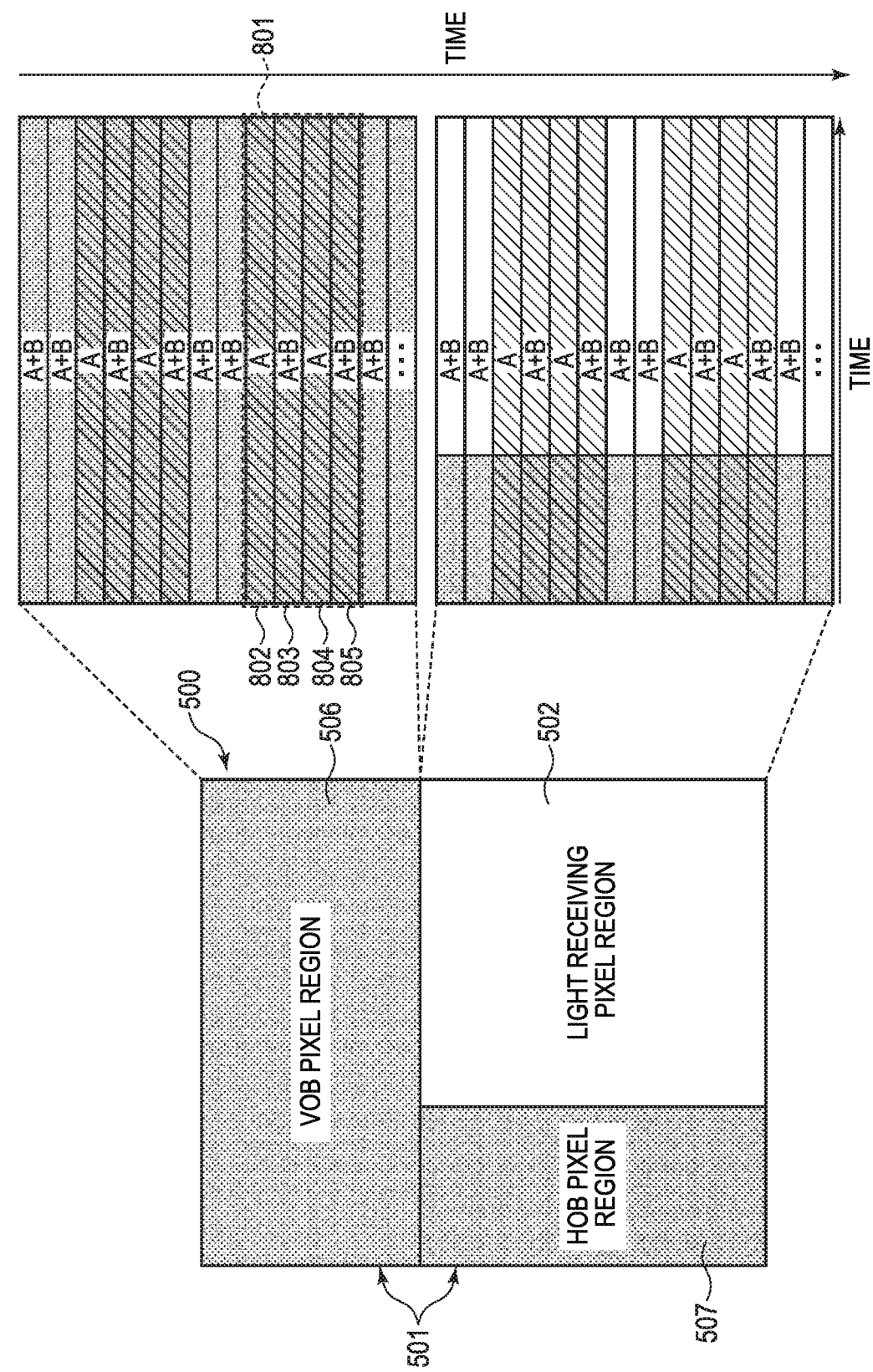
FIG. 8A and FIG. 8B are conceptual diagrams of an output signal in an imaging device according to a second embodiment of the present invention.

An imaging device and a method of driving the same according to a second embodiment of the present invention will be described with reference to FIG. 8A to FIG. 9. The same components as those of the imaging device according to the first embodiment will be labeled with the same references, and the description thereof will be omitted or simplified.

In the first embodiment, when a correction value of data of the leading pixel on the focus detection data row is generated, a clamp value used for a captured image data row that already follows shading in the vertical direction is used as a reference. This operation applies for a case where there are two or more consecutive focus detection data rows, that is, a correction value is generated with a clamp value used for a captured image data row being used as a reference in the leading pixel on each row, and the clamp value is caused to follow the level difference of the focus detection data row in the one row thereof. However, the clamp value may not sufficiently follow the level difference of the focus detection data row only in one row, and it is also assumed that a suitable correction value is not necessarily generated.

In the present embodiment, a method of driving the imaging device that can generates a suitable correction value taking into consideration of a case where there are two or more consecutive focus detection data rows is illustrated.

FIG. 8A and FIG. 8B are diagrams conceptually illustrating a readout operation in the imaging device of the present embodiment. FIG. 8A illustrates a configuration example of the pixel array 500 arranged in the pixel unit 101 in the same manner as FIG. 5A. FIG. 8B is a conceptual diagram in which signals output from the imaging device 100 are arranged from the left in the output order while each new row is started based on the horizontal synchronization signal SYNC as a reference. The width in the horizontal direction in FIG. 8B corresponds to the length of one horizontal period defined by the interval of the horizontal synchronization signal SYNC.

In the present embodiment, as illustrated in FIG. 8B, it is assumed that there are two or more consecutive focus detection data rows. For example, in a block 801 of FIG. 8B, two consecutive focus detection data rows are read out. That is, from one focus detection data row of the pixel array 500, an A-image signal is output during a horizontal period 802, and an (A+B)-image signal is output during the next horizontal period 803 in accordance with the timing chart of FIG. 4. Further, from the next focus detection data row subsequent to the one focus detection data row, an A-image signal is output during the next horizontal period 804, and an (A+B)-image signal is output during the next horizontal period 805 in accordance with the timing chart of FIG. 4. Note that, although FIG. 8B illustrates the case where two consecutive focus detection data rows are read out, the number of consecutive focus detection data rows may be three or greater.

Figure 9:
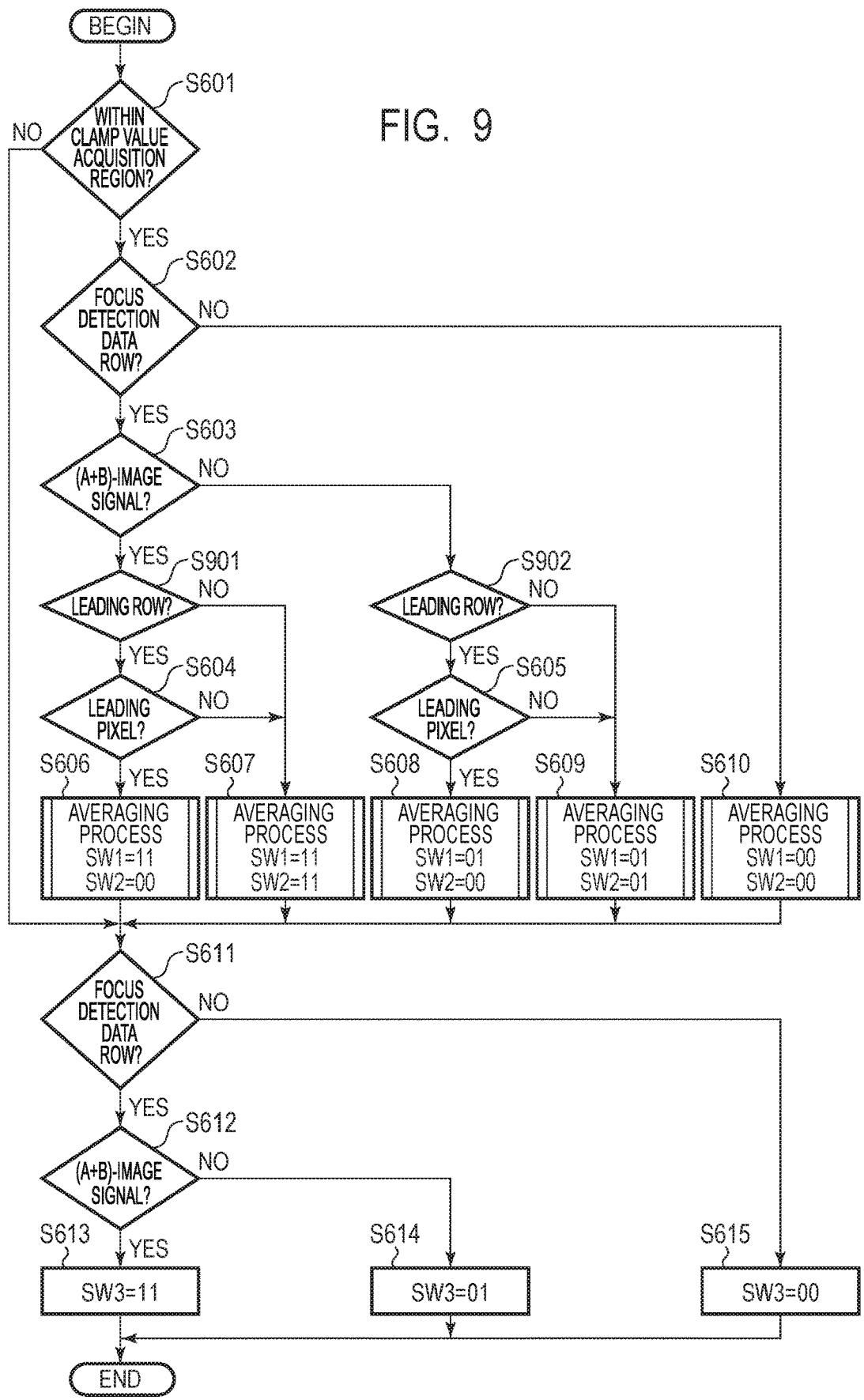
FIG. 9 is a flowchart illustrating a method of generating a clamp value in the imaging device according to the second embodiment of the present invention.
Figure 10:
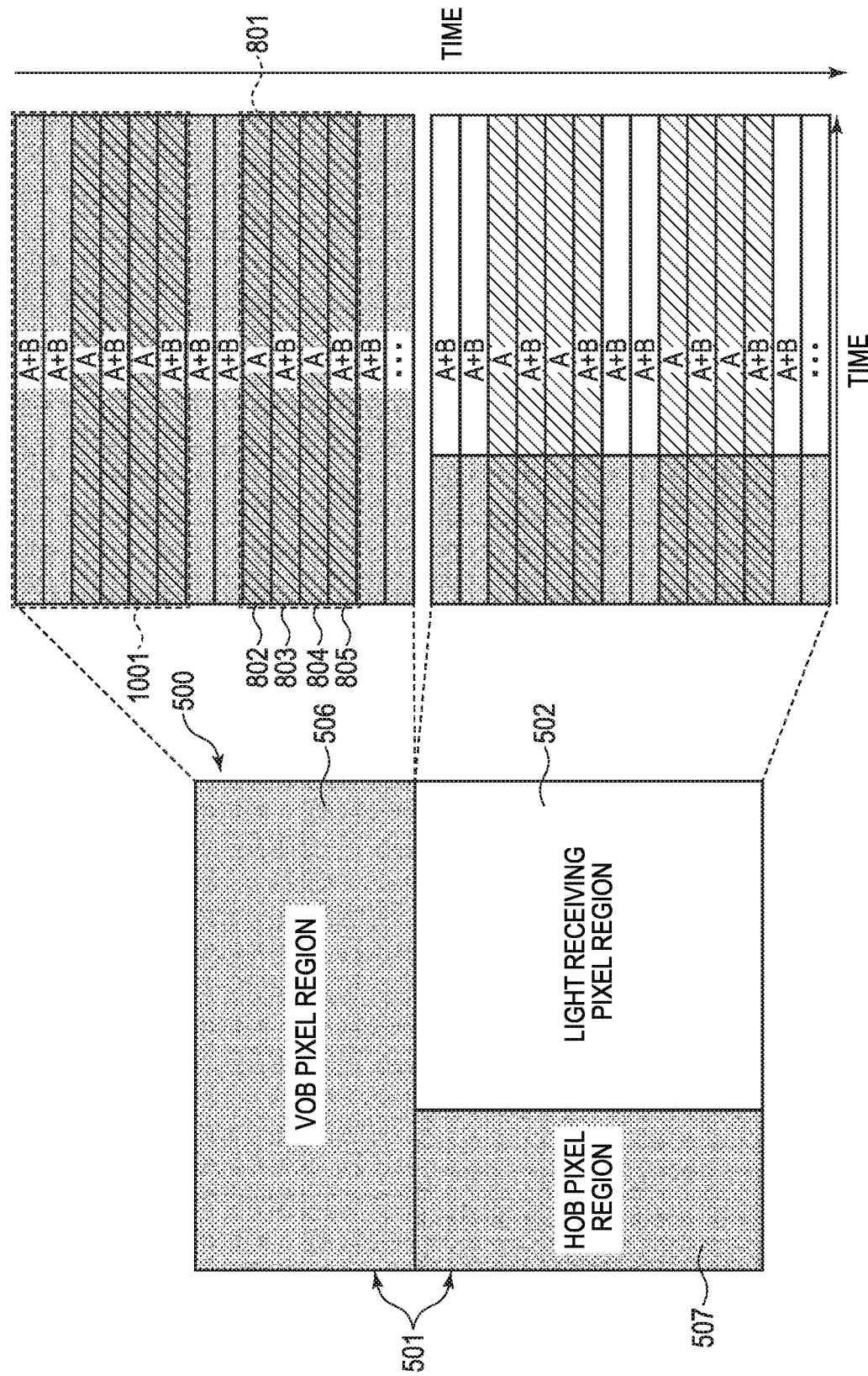
FIG. 10A and FIG. 10B are conceptual diagrams of an output signal in an imaging device according to a third embodiment of the present invention.

FIG. 9 is a flowchart illustrating a method of generating a clamp value in the imaging device of the present embodiment. When a clamp value is generated, data is loaded sequentially from a data group output from the pixel unit 101, and a process in accordance with the flowchart illustrated in FIG. 9 is performed on data output from each of the unit pixels 102. A clamp value for each of the unit pixels 102 is generated in accordance with step S601 to step S615 illustrated in FIG. 9.

The flowchart of the present embodiment illustrated in FIG. 9 is the same as the flowchart of the first embodiment illustrated in FIG. 6 except for further including step S901 between step S603 and step S604 and step S902 between step S603 and step S605. Since the operations from step S601 to step S615 are the same as the operations described in the first embodiment, the description thereof will be omitted here.

In step S603, it is determined whether the target data is the (A+B)-image signal or the A-image signal of a focus detection data row. As a result of the determination, if the target data is the (A+B)-image signal of a focus detection data row (Yes), the process proceeds to step S901, and if the target data is the A-image signal of a focus detection data row (No), the process proceeds to step S902.

In step S901, it is determined whether or not the target data is the (A+B)-image signal of pixels belonging to the leading row of focus detection data rows. Here, the (A+B)-image signal of pixels belonging to the leading row of focus detection data rows means an (A+B)-image signal of pixels belonging to the first processed focus detection data row of the clamp value acquisition region. If the target data is the (A+B)-image signal of pixels belonging to the leading row of focus detection data rows (Yes), the process proceeds to step S604, and if the target data is not the (A+B)-image signal of pixels belonging to the leading row of focus detection data rows (No), the process proceeds to step S607.

In step S902, it is determined whether or not the target data is the A-image signal of pixels belonging to the leading row of focus detection data rows. Here, the A-image signal of pixels belonging to the leading row of focus detection data rows means an A-image signal of pixels belonging to the first processed focus detection data row of the clamp value acquisition region. If the target data is the A-image signal of pixels belonging to the leading row of focus detection data rows (Yes), the process proceeds to step S605, and if the target data is not the A-image signal of pixels belonging to the leading row of focus detection data rows (No), the process proceeds to step S609.

As described above, in the present embodiment, when there are two or more (for example, N) consecutive focus detection data rows, a clamp value used for a captured image data row that already follows shading in the vertical direction is used as a reference only for generation of a correction value for the leading pixel on the first row. The clamp value is then caused to follow the level difference of the focus detection data rows over N rows. This enables more suitable black level correction in which not only shading in the vertical direction but also a level difference of the focus detection data row is followed.

Therefore, according to the present embodiment, it is possible to suitably performs not only black level correction used for a captured image data row but also black level correction used for a focus detection data row, and an imaging device that can obtain a good image can be provided.

Third Embodiment

An imaging device and a method of driving the same according to a third embodiment of the present invention will be described with reference to FIG. 10A to FIG. 14. The same components as those of the imaging device according to the first and second embodiments will be labeled with the same references, and the description thereof will be omitted or simplified.

In Japanese Patent Application Laid-Open No. 2017-098931, the difference between the average value used for the focus detection data row and the average value used for the captured image data row is calculated in the VOB pixel region, and this difference is held as an offset value. It is further illustrated that, in the HOB pixel region, a value obtained by adding the offset value to a clamp value used for the captured image data row is corrected as a clamp value used for the focus detection data row. However, for example, due to the difference in the shading shape or the like between the captured image data row and the focus detection data row, the difference between the captured image data row and the focus detection data row may differ between the upper part of a screen and the lower part of the screen. In such a case, in the method of Japanese Patent Application Laid-Open No. 2017-098931, a clamp value of the focus detection data row may deviate from a desired value.

The present embodiment illustrates an imaging device and a drive method thereof that can suitably perform black level correction used for a focus detection data row even when the difference between the captured image data row and the focus detection data row differs between the upper part of a screen and the lower part of the screen.

FIG. 10A and FIG. 10B are diagrams conceptually illustrating a readout operation in the imaging device of the present embodiment. FIG. 10A illustrates a configuration example of the pixel array 500 arranged in the pixel unit 101 in the same manner as FIG. 5A. FIG. 10B is a conceptual diagram in which signals output from the imaging device 100 are arranged from the left in the output order while each new row is started based on the horizontal synchronization signal SYNC as a reference. The width in the horizontal direction in FIG. 10B corresponds to the length of one horizontal period defined by the interval of the horizontal synchronization signal SYNC.

In FIG. 10B, it is assumed that there are two or more consecutive focus detection data rows in the same manner as the case of FIG. 8B. For example, in a block 801 of FIG. 10B, two consecutive focus detection data rows are read out. That is, from one focus detection data row of the pixel array 500, an A-image signal is output during a horizontal period 802, and an (A+B)-image signal is output during the next horizontal period 803 in accordance with the timing chart of FIG. 4. Further, from the next focus detection data row subsequent to the one focus detection data row, an A-image signal is output during the next horizontal period 804, and an (A+B)-image signal is output during the next horizontal period 805 in accordance with the timing chart of FIG. 4. Note that, although FIG. 10B illustrates the case where two consecutive focus detection data rows are read out, the number of consecutive focus detection data rows may be three or greater.

In the present embodiment, in addition to a clamp value acquisition region set in the first and second embodiments, an offset value acquisition region 1001 is set in the reference pixel region 501. Note that, although the present embodiment is described assuming that the offset value acquisition region and the clamp value acquisition region are different regions, the offset value acquisition region and the clamp value acquisition region may be set as the same region.

In the present embodiment, a difference between the average value used for the focus detection data row and the average value used for the captured image data row is held in advance as an offset value, and these average values are used to generate a clamp value.

Figure 13:
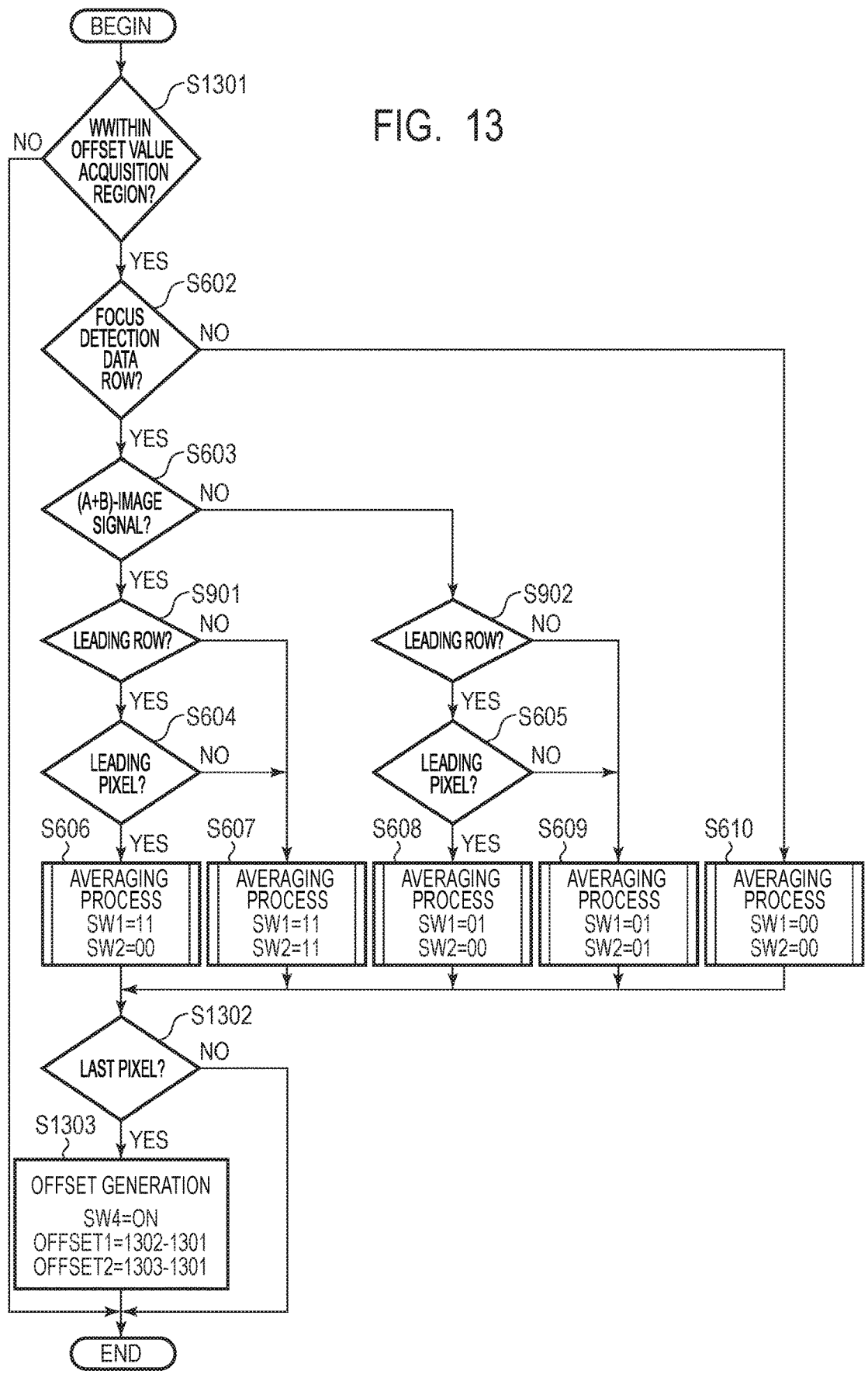
FIG. 13 is a flowchart illustrating a method of generating an offset value in the imaging device according to the third embodiment of the present invention.

First, a method of generating an offset value in the imaging device of the present embodiment will be described with reference to FIG. 13 and FIG. 14. FIG. 13 is a flowchart illustrating the method of generating an offset value in the imaging device of the present embodiment. When an offset value is generated, data is loaded sequentially from a data group output from the pixel unit 101, and a process in accordance with the flowchart illustrated in FIG. 13 is performed on data output from each of the unit pixels 102. An offset value for each of the unit pixels 102 is generated in accordance with step S1301 to step S1303 illustrated in FIG. 13.

First, in step S1301, it is determined whether or not the target data is data within the offset value acquisition region. As a result of the determination, if the target data is data within the offset value acquisition region (Yes), the process proceeds to step S602, and if the target data is not data within the offset value acquisition region (No), the process ends.

Since the operations in steps S602 to S605, S901, and S902 are the same as the operations of steps S602 to S605, S901, and S902 described with reference to FIG. 6 and FIG. 9 in the first and second embodiments, the description thereof will be omitted here.

In steps S606 to S610, an averaging process in accordance with the type of the target data is performed. For example, an LPF circuit illustrated in FIG. 14 is used for the averaging process of the target data. FIG. 14 is a block diagram illustrating a configuration example of the LPF circuit used for generation of an offset value.

Figure 14:
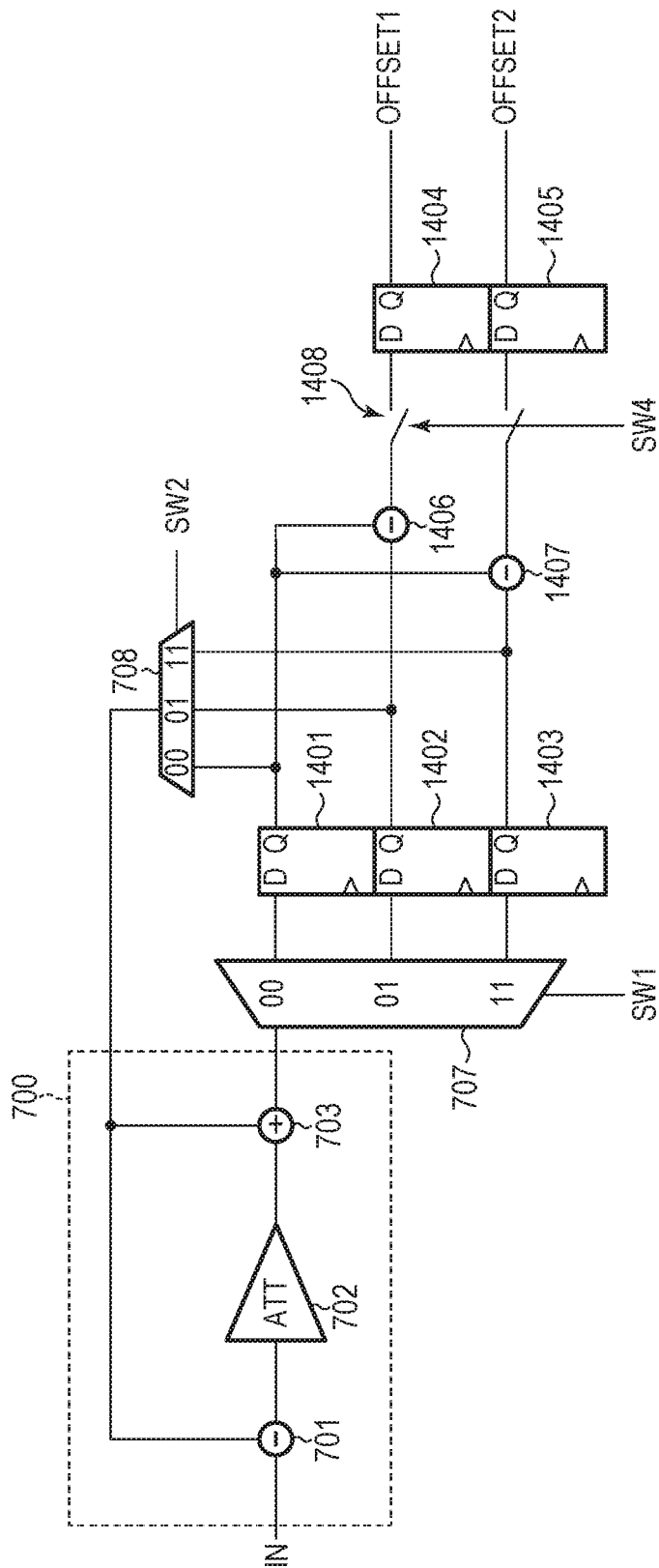
FIG. 14 is a block diagram illustrating a configuration example of the averaging process unit used for generating an offset value in the imaging device according to the third embodiment of the present invention.

As illustrated in FIG. 14, the LPF circuit used for generation of an offset value includes the averaging circuit 700, holding units 1401, 1402, 1403, 1404, and 1405, switches 707, 708, and 1408, and subtractor units 1406 and 1407. The averaging circuit 700 includes a subtractor unit 701, an attenuator unit 702, and an adder unit 703.

The averaging circuit 700 calculates a difference between input data and held data at the subtractor unit 701, attenuates the difference data in accordance with a feedback gain at the attenuator unit 702, adds the attenuated data and the held data at the adder unit 703, and holds the added data in the holding unit 1401, 1402, or 1403. The averaging circuit 700 performs the above process every time data is input, and adds data of a difference from a target level, that is, the average value of the input data little by little to cause the held data to be gradually closer to the target level.

Each of the holding units 1401, 1402, and 1403 is a holding unit used for holding an offset value. Specifically, the holding unit 1401 is a holding unit that holds an offset value used for a captured image data row. The holding unit 1402 is a holding unit that holds an offset value used for the A-image signal of a focus detection data row. The holding unit 1403 is a holding unit that holds an offset value used for the (A+B)-image signal of a focus detection data row.

The switches 707 and 708 are switches that select the holding unit 1401, 1402, or 1403. Specifically, the switch 707 is a switch that switches the holding unit used for holding data processed by the averaging circuit 700 out of the holding units 1401, 1402, and 1403. The switch 708 is a switch that switches the offset value to be used as feedback data in performing an averaging process in the averaging circuit 700 out of the offset values held in the holding units 1401, 1402, and 1403.

The subtractor unit 701 calculates a difference between the input data IN and the held data selected by the switch 708 out of held data held by the holding units 1401, 1402, and 1403 and outputs the difference data to the attenuator unit 702. The switch 708 selects any one of the holding units 1401, 1402, and 1403 in accordance with the value of the control signal SW2. The attenuator unit 702 attenuates the difference data in accordance with a predetermined feedback gain and outputs the attenuated data to the adder unit 703. The adder unit 703 adds the attenuated data and the held data selected by the switch 708 and holds the added data as new held data in the holding unit selected by the switch 707 out of the holding units 1401, 1402, and 1403. The switch 707 selects any one of the holding units 1401, 1402, and 1403 in accordance with the value of a control signal SW1.

The subtractor unit 1406 outputs data of the difference between data held in the holding unit 1401 and data held in the holding unit 1402 to the holding unit 1404 in response to the switch 1408 being turned on. The subtractor unit 1407 outputs data of the difference between data held in the holding unit 1401 and data held in the holding unit 1403 to the holding unit 1405 in response to the switch 1408 being turned on. The switch 1408 is controlled by a control signal SW4. The output of the holding unit 1404 is an offset value OFFSET1, and the output of the holding unit 1405 is an offset value OFFSET2.

Since the averaging process of step S606 to step S610 performed by using the LPF circuit illustrated in FIG. 14 is the same as the operations of steps S606 to S610 described with reference to FIG. 6 in the first embodiment, the description thereof will be omitted here. After the process of steps S606 to S610, the process proceeds to step S1302.

In step S1302, it is determined whether or not the target data is the (A+B)-image signal of the last pixel on a focus detection data row. Here, the last pixel means the last processed pixel in the offset value acquisition region. As a result of the determination, if the target data is the (A+B)-image signal of the last pixel on a focus detection data row (Yes), the process proceeds to step S1303, and if the target data is not the (A+B)-image signal of the last pixel on a focus detection data row (No), the process ends.

In step S1303, to acquire an offset value by using the average value processed in steps S606 to S610, the switch 1408 is turned on.

In response to the switch 1408 being turned on, the difference between the average value of the A-image signals of the focus detection data row held in the holding unit 1402 and the average value of captured image data held in the holding unit 1401 is held in the holding unit 1404. The difference data held in the holding unit 1404 is the offset value OFFSET1 used for the A-image signal of the focus detection data row.

Further, in response to the switch 1408 being turned on, the difference between the average value of the (A+B)-image signals of the focus detection data row held in the holding unit 1403 and the average value of captured image data held in the holding unit 1401 is held in the holding unit 1405. The difference data held in the holding unit 1404 is the offset value OFFSET2 used for the (A+B)-image signal of the focus detection data row.

In such a way, the offset value OFFSET1 used for the A-image signal of the focus detection data row and the offset value OFFSET2 used for the (A+B)-image signal of the focus detection data row are acquired.

Next, a method of generating a clamp value in the imaging device of the present embodiment will be described with reference to FIG. 11 and FIG. 12.

Figure 11:
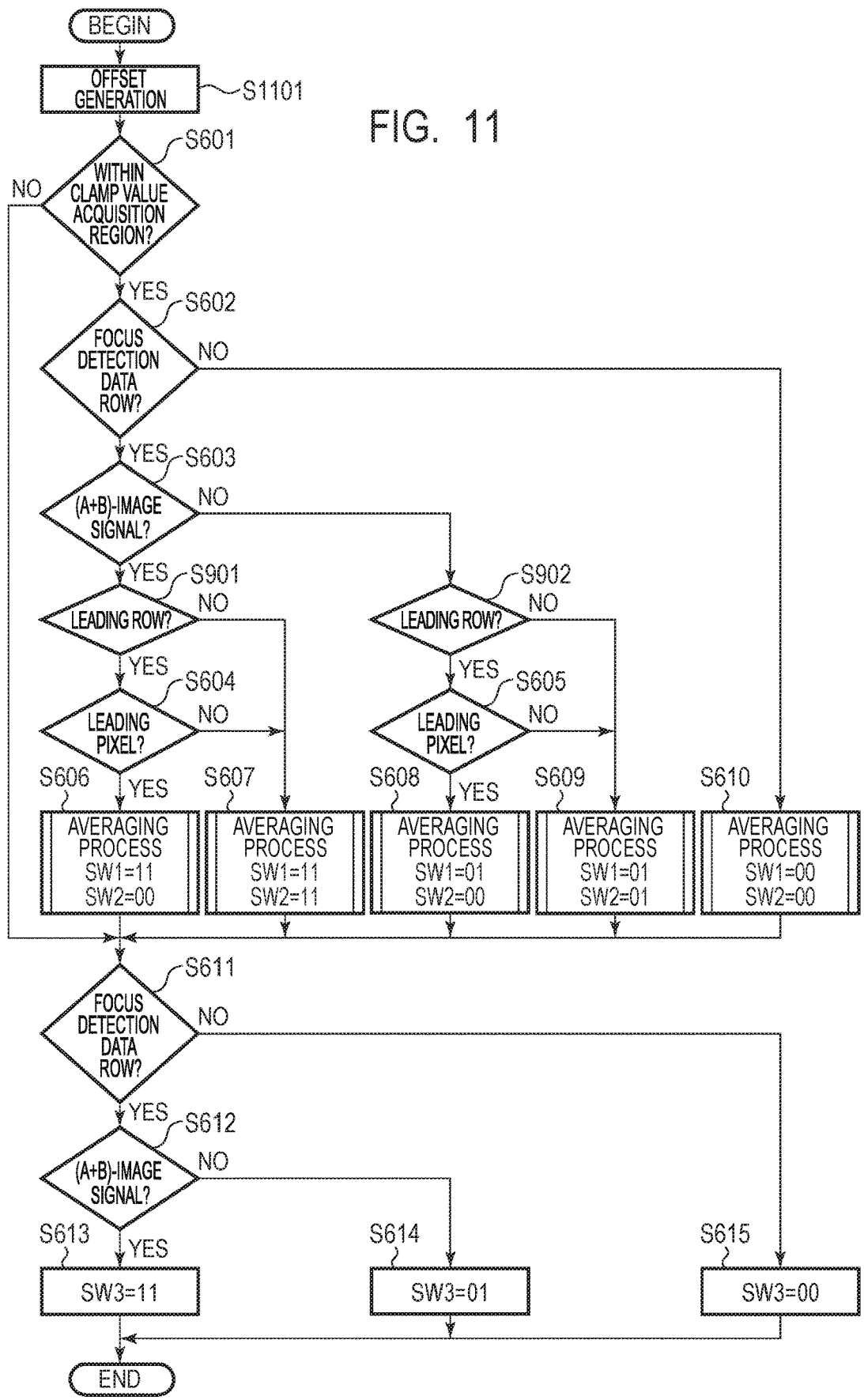
FIG. 11 is a flowchart illustrating a method of generating a clamp value in the imaging device according to the third embodiment of the present invention.

FIG. 11 is a flowchart illustrating the method of generating a clamp value in the imaging device of the present embodiment. When a clamp value is generated, data is loaded sequentially from a data group output from the pixel unit 101, and a process in accordance with the flowchart illustrated in FIG. 11 is performed on data output from each of the unit pixels 102. The clamp value for each of the unit pixels 102 is generated in accordance with step S1101 to step S615 illustrated in FIG. 6.

First, in step S1101, the offset value OFFSET1 used for the A-image signal of the focus detection data row and the offset value OFFSET2 used for the (A+B)-image signal of the focus detection data row are generated in accordance with the flowchart of FIG. 13. After the process of step S1101, the process proceeds to step S601.

Since the operations in steps S601 to S605, S901, S902, and S611 to S615 are the same as the operations illustrated with reference to FIG. 6 and FIG. 9 in the first and second embodiments, the description thereof will be omitted here.

In step S606 to step S610, an averaging process in accordance with the type of the target data is performed. For example, an LPF circuit illustrated in FIG. 12 is used for the averaging process of the target data. FIG. 12 is a block diagram illustrating a configuration example of the LPF circuit used for generation of a clamp value in the present embodiment.

Figure 12:
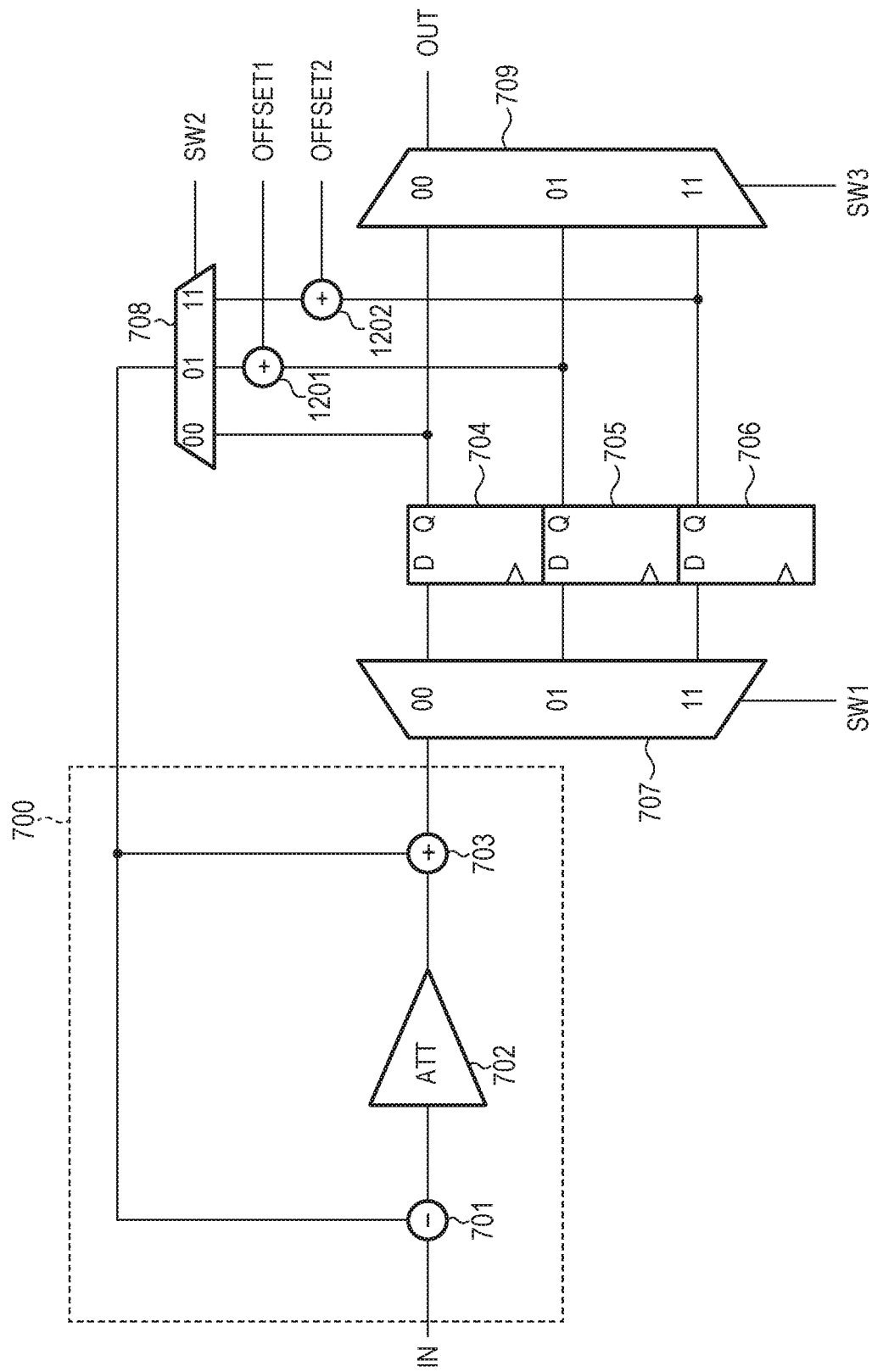
FIG. 12 is a block diagram illustrating a configuration example of an averaging process unit used for generating a clamp value in the imaging device according to the third embodiment of the present invention.

As illustrated in FIG. 12, the LPF circuit used for generation of a clamp value in the present embodiment is the same as the LPF circuit illustrated in FIG. 7 described in the first embodiment except for further having adder units 1201 and 1202. The adder unit 1201 is arranged between the holding unit 705 and the switch 708. Thereby, it is possible to add the offset value OFFSET1 to the held data held in the holding unit 705 and input the added value to the switch 708. Similarly, the adder unit 1202 is arranged between the holding unit 706 and the switch 708. Thereby, it is possible to add the offset value OFFSET2 to the held data held in the holding unit 706 and input the added value to the switch 708.

In step S610, an averaging process is performed on pixel data of the captured image data row with SW1=00 and SW2=00. That is, when the target data is data of a captured image data row in the clamp value acquisition region, a clamp value of the captured image data row held in the holding unit 704 is used as feedback data to generate a clamp value and hold the clamp value in the holding unit 704. After the process of step S610, the process proceeds to step S611.

In step S606, an averaging process is performed on the (A+B)-image signal of the leading pixel on the focus detection data row with SW1=11 and SW2=00. That is, when the (A+B)-image signal of the leading pixel on the focus detection data row is processed, a value obtained by adding the offset value OFFSET2 to the clamp value used for the captured image data row held in the holding unit 704 is used as feedback data to generate a clamp value and hold the clamp value in the holding unit 706. After the process of step S606, the process proceeds to step S611.

In step S607, an averaging process is performed on the (A+B)-image signal of a pixel other than the leading pixel on the focus detection data row with SW1=11 and SW2=11. That is, when the (A+B)-image signal of a pixel other than the leading pixel on the focus detection data row is processed, a clamp value used for the (A+B)-image signal of the focus detection data row held in the holding unit 706 is used as feedback data to generate a clamp value and hold the clamp value in the holding unit 706. After the process of step S607, the process proceeds to step S611.

In step S608, an averaging process is performed on the A-image signal of the leading pixel on the focus detection data row with SW1=01 and SW2=00. That is, when the A-image signal of the leading pixel on the focus detection data row is processed, a value obtained by adding the offset value OFFSET1 to the clamp value used for the captured image data row held in the holding unit 704 is used as feedback data to generate a clamp value and hold the clamp value in the holding unit 705. After the process of step S608, the process proceeds to step S611.

In step S609, an averaging process is performed on the A-image signal of a pixel other than the leading pixel on the focus detection data row with SW1=01 and SW2=01. That is, when the A-image signal of a pixel other than the leading pixel on the focus detection data row is processed, a clamp value used for the A-image signal of the focus detection data row held in the holding unit 705 is used as feedback data to generate a clamp value and hold the clamp value in the holding unit 705. After the process of step S609, the process proceeds to step S611.

As described above, in the present embodiment, when there are two or more (for example, N) consecutive focus detection data rows, data obtained by adding an offset value to a clamp value used for a captured image data row is used as a reference only for generation of a correction value for the leading pixel on the first row. The clamp value is then caused to follow the level difference of respective focus detection data rows over N rows. Therefore, even when the difference between the captured image data row and the focus detection data row differs between the upper part of a screen and the lower part of the screen, black level correction that follows the level difference of the focus detection data row in addition to shading in the vertical direction is possible.

Therefore, according to the present embodiment, it is possible to suitably performs not only black level correction used for a captured image data row but also black level correction used for a focus detection data row, and an imaging device that can obtain a good image can be provided.

Note that, in the present embodiment, although the offset value is used for only the leading pixel on the first row when two or more consecutive focus detection data rows are read out as with the second embodiment, the offset value may be used for the leading pixel on each row of the focus detection data rows as with the first embodiment. In such a case, when the difference between the captured image data row and the focus detection data row differs between the upper part of a screen and the lower part of the screen, such difference will be followed in one row.

Fourth Embodiment

Figure 15:
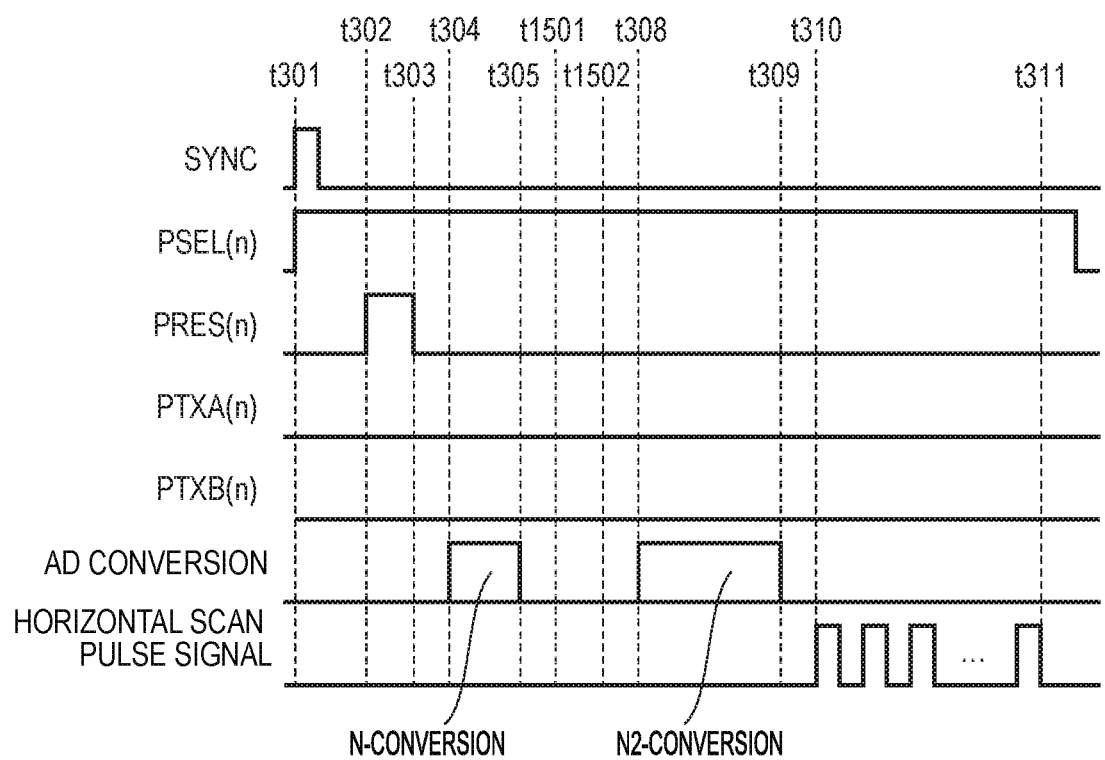

An imaging device and a method of driving the same according to a fourth embodiment of the present invention will be described with reference to FIG. 15 to FIG. 16. The same components as those of the imaging device according to the first to third embodiments will be labeled with the same references, and the description thereof will be omitted or simplified.

In the third embodiment, to generate a clamp value used for a focus detection data row, the difference between a captured image data row and a focus detection data row is used as an offset value. Since such an offset value is generated as a difference of data of different rows, it is assumed that a desired offset is not obtained when vertical shading or the like occurs, for example.

In the present embodiment, an imaging device and a drive method thereof that can suppress influence due to a photodiode, such as vertical shading, and improve accuracy of an offset value used for a clamp value used for a focus detection data row are illustrated.

First, the operation of the pixel unit 101 of the imaging device according to the present embodiment will be described with reference to FIG. 15 and FIG. 16. FIG. 15 is a timing chart when pixel signals are read out from the unit pixels 102 belonging to a captured image data row within the offset value acquisition region. FIG. 16 is a timing chart when pixel signals are read out from the unit pixels 102 belonging to a focus detection data row in the offset value acquisition region. FIG. 15 and FIG. 16 illustrate a readout operation when the n-th row is selected by the vertical scanning unit 103 as one example. Note that each transistor of the unit pixel 102 is turned on when a High-level control signal is supplied from the vertical scanning unit 103 and turned off when a Low-level control signal is supplied from the vertical scanning unit 103.

First, the readout operation for a captured image data row in the offset value acquisition region will be described with reference to FIG. 15. FIG. 15 illustrates the horizontal synchronization signal SYNC, control signals PSEL(n), PRES(n), PTXA(n), and PTXB(n), an AD conversion period, and a horizontal scan pulse signal.

Since the operations from time t301 to time t305 are the same as the operations from time t301 to time t305 described with reference to FIG. 3 in the first embodiment, the description thereof will be omitted here.

In the subsequent period from time t1501 to time t1502, unlike the case of FIG. 3, the control signals PTXA(n) and PTXB(n) on the n-th row are maintained at the Low level, respectively. Thereby, in each of the unit pixels 102 belonging to the n-th row, the transfer transistors M1A and M1B are still in the off-state, and the N-signal is continued to be output to the vertical output line 111. A signal output to the vertical output line 111 at this time will be referred to as an N2-signal.

The subsequent period from time t308 to time t309 is a period in which an AD conversion process is performed on the N2-signal output to the vertical output line 111. The N2-signal output to the vertical output line 111 is read out to the readout circuit unit 105 and converted into a digital signal at the AD converter unit 106. The digital signal of the N2-signal obtained by the AD converter unit 106 is held in a different memory of the memory unit 107 from the memory in which the N-signal is held. The operation performed from time t308 to time t309, that is, the operation to convert an N2-signal into a digital signal will be referred to as N2-conversion.

The subsequent period from time t310 to time t311 is a period in which the N-signal and the N2-signal held in the memory unit 107 are transferred to the signal processing unit 109. The horizontal scanning unit 108 outputs a horizontal scan pulse signal to the memory unit 107. The memory unit 107 transfers the N-signal and the N2-signal corresponding to an address (column) selected by the horizontal scan pulse signal to the signal processing unit 109. By repeatedly performing this operation (performing horizontal scan) from the 0-th column to the m-th column while changing the address selected by the horizontal scan plus signal, it is possible to read out the N-signal and the N2-signal for one row that is a row to be read out. The signal processing unit 109 performs a process of subtracting an N-signal corresponding to an N2-signal from the N2-signal and removes fixed pattern noise superimposed on the N2-signal.

In this driving, since the transfer transistors M1A and M1B are not turned on during the period from time t1501 to time t1502, captured image data that is not affected by the photodiodes PDA and PDB can be read out.

Next, a readout operation for a focus detection data row in the offset value acquisition region will be described with reference to FIG. 16. FIG. 16 illustrates the horizontal synchronization signal SYNC, control signals PSEL(n), PRES(n), PTXA(n), and PTXB(n), an AD conversion period, and a horizontal scan pulse signal.

Since the operations from time t401 to time t405 and time t412 to time t414 are the same as the operations from time t301 to time t305 described with reference to FIG. 3 and FIG. 4 in the first embodiment, the description thereof will be omitted here.

In the period from time t1601 to time t1602, unlike the case of FIG. 4, the control signal PTXA(n) on the n-th row is maintained at the Low level. Thereby, in each of the unit pixels 102 belonging to the n-th row, the transfer transistor MLA is still in the off-state, and the N-signal is continued to be output to the vertical output line 111. A signal output to the vertical output line 111 at this time will be referred to as an N2-signal.

The subsequent period from time t408 to time t409 is a period in which an AD conversion process is performed on the N2-signal output to the vertical output line 111. The N2-signal output to the vertical output line 111 is read out to the readout circuit unit 105 and converted into a digital signal at the AD converter unit 106. The digital signal of the N2-signal obtained by the AD converter unit 106 is held in a different memory of the memory unit 107 from the memory in which the N-signal is held. The operation performed from time t408 to time t409, that is, the operation to convert an N2-signal into a digital signal will be referred to as N2-conversion.

The subsequent period from time t410 to time t411 is a period in which the N-signal and the N2-signal held in the memory unit 107 are transferred to the signal processing unit 109. The horizontal scanning unit 108 outputs a horizontal scan pulse signal to the memory unit 107. The memory unit 107 transfers the N-signal and the N2-signal corresponding to an address (column) selected by the horizontal scan pulse signal to the signal processing unit 109. By repeatedly performing this operation (performing horizontal scan) from the 0-th column to the m-th column while changing the address selected by the horizontal scan plus signal, it is possible to read out the N-signal and the N2-signal for one row that is a row to be read out.

In the period from time t1603 to time t1604, unlike the case of FIG. 4, the control signals PTXA(n) and PTXB(n) on the n-th row are maintained at the Low level, respectively. Thereby, in each of the unit pixels 102 belonging to the n-th row, the transfer transistors M1A and M1B are still in the off-state, and the N-signal is continued to be output to the vertical output line 111. A signal output to the vertical output line 111 at this time will be referred to as an N3-signal.

The subsequent period from time t417 to time t418 is a period in which an AD conversion process is performed on the N3-signal output to the vertical output line 111. The N3-signal output to the vertical output line 111 is read out to the readout circuit unit 105 and converted into a digital signal at the AD converter unit 106. The digital signal of the N3-signal obtained by the AD converter unit 106 is held in the same memory of the memory unit 107 as the memory in which the N2-signal is held. The operation performed from time t417 to time t418, that is, the operation to convert an N3-signal into a digital signal will be referred to as N3-conversion.

The subsequent period from time t419 to time t420 is a period in which the N-signal and the N3-signal held in the memory unit 107 are transferred to the signal processing unit 109. The horizontal scanning unit 108 outputs a horizontal scan pulse signal to the memory unit 107. The memory unit 107 transfers the N-signal and the N3-signal corresponding to an address (column) selected by the horizontal scan pulse signal to the signal processing unit 109. By repeatedly performing this operation (performing horizontal scan) from the 0-th column to the m-th column while changing the address selected by the horizontal scan plus signal, it is possible to read out the N-signal and the N3-signal for one row that is a row to be read out.

In such a way, an N2-signal, an N-signal corresponding to the N2-signal, an N3-signal, and an N-signal corresponding to the N3-signal for one row of the row to be read out can be read out.

In this driving, the transfer transistors M1A and M1B are not turned on during the period from time t1601 to time t1602 and the period from time t1603 to time t1604. Therefore, according to this driving, focus detection data not affected by the photodiodes PDA and PDB can be read out.

By applying the driving described above to readout of the unit pixels 102 arranged in the offset value acquisition region and using the offset value generation method of the third embodiment to generate an offset value, it is possible to acquire a suitable offset value not affected by a photodiode. By using the offset value generated in such a way and using the clamp value generation method of the third embodiment to generate a clamp value, it is possible to acquire a clamp value used for the focus detection data row without affected by a photodiode.

Then, data obtained by adding an offset value acquired from the offset value acquisition region in the upper part of a screen to a clamp value used for the captured image data row is used as a reference only for generation of a correction value of the leading pixel on the leading row of the focus detection data row. Such an offset value is an offset value not affected by a photodiode. For generation of each correction value of a pixel other than the above, a clamp value of the focus detection data row is used as a reference. The clamp value is then caused to follow the level difference on respective focus detection data rows over N rows. As a result, a more suitable clamp value can be generated, and an imaging device that can obtain a better image can be provided.

As described above, in the present embodiment, an offset value is generated from data not affected by a photodiode. Further, when there are two or more (for example, N) consecutive focus detection data rows, data obtained by adding the offset value described above to the clamp value used for the captured image data row is used as a reference only for generation of a correction value of the leading pixel on the first row. The clamp value is then caused to follow the level difference of the focus detection data rows over N rows. Accordingly, it is possible to acquire an offset value that is more accurate than that in the third embodiment, and this enables black level correction that follows the level difference of respective focus detection data rows in addition to shading in the vertical direction.

Therefore, according to the present embodiment, it is possible to suitably performs not only black level correction used for a captured image data row but also black level correction used for a focus detection data row, and an imaging device that can obtain a good image can be provided.

Note that, in the present embodiment, although the offset value is used for only the leading pixel on the first row when two or more consecutive focus detection data rows are read out as with the second embodiment, the offset value may be used for the leading pixel on each row of the focus detection data rows as with the first embodiment. In such a case, when the difference between the captured image data row and the focus detection data row differs between the upper part of a screen and the lower part of the screen, such difference can be followed in one row.

Fifth Embodiment

An imaging device and a method of driving the same according to a fifth embodiment of the present invention will be described with reference to FIG. 17A to FIG. 18. The same components as those of the imaging device according to the first to fourth embodiments will be labeled with the same references, and the description thereof will be omitted or simplified.

In the first to fourth embodiments, the LPF circuit illustrated in FIG. 7 or FIG. 12 is used to generate a clamp value. In this method, held data of the LPF circuit is caused to be gradually closer to the target level by adding data of a difference from a target level, that is, the average value of the input data little by little every time data is input. Thus, the generated clamp value is affected the most by the last processed data, and if the last data significantly has a value deviating from the average value, such as flaw data, for example, the clamp value may deviate from a desired average value.

In the present embodiment, an imaging device and a drive method thereof that can perform a correction process based on a more suitable clamp value are illustrated.

Figure 18:
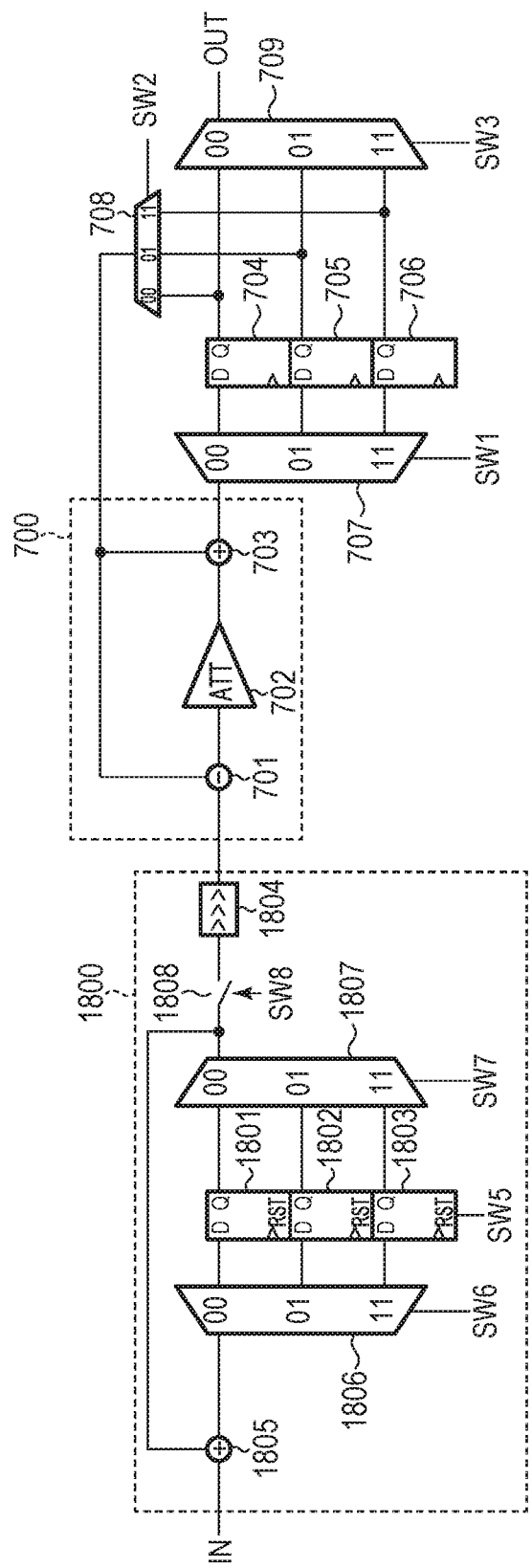
FIG. 18 is a block diagram illustrating a configuration example of the averaging process unit used for generating a clamp value in the imaging device according to the fifth embodiment of the present invention.

As illustrated in FIG. 18, the signal processing unit 109 of the imaging device 100 according to the present embodiment further includes an average calculation unit 1800 on the pre-stage of the LPF circuit illustrated in FIG. 7.

As illustrated in FIG. 18, the average calculation unit 1800 includes integration holding units 1801, 1802, and 1803, a bit shift unit 1804, an adder unit 1805, and switches 1806, 1807, and 1808.

The adder unit 1805 generates addition data obtained by adding the input data IN and held data held in an integration holding unit selected by the switch 1807 out of the integration holding units 1801, 1802, and 1803. The switch 1807 selects any one of the integration holding units 1801, 1802, and 1803 in accordance with the value of a control signal SW7. The addition data generated by the adder unit 1805 is held in an integration holding unit selected by the switch 1806 out of the integration holding units 1801, 1802, and 1803. The switch 1806 selects any one of the integration holding units 1801, 1802, and 1803 in accordance with the value of a control signal SW6. The output terminal of the switch 1807 is connected to the input terminal of the averaging circuit 700 via the switch 1808 and the bit shift unit 1804. The switch 1808 is controlled by a control signal SW8.

Since the LPF circuit is the same as the LPF circuit described with reference to FIG. 7 in the first embodiment, the description thereof will be omitted here. The LPF circuit illustrated in FIG. 12 may be used for the LPF circuit.

Figure 17A:
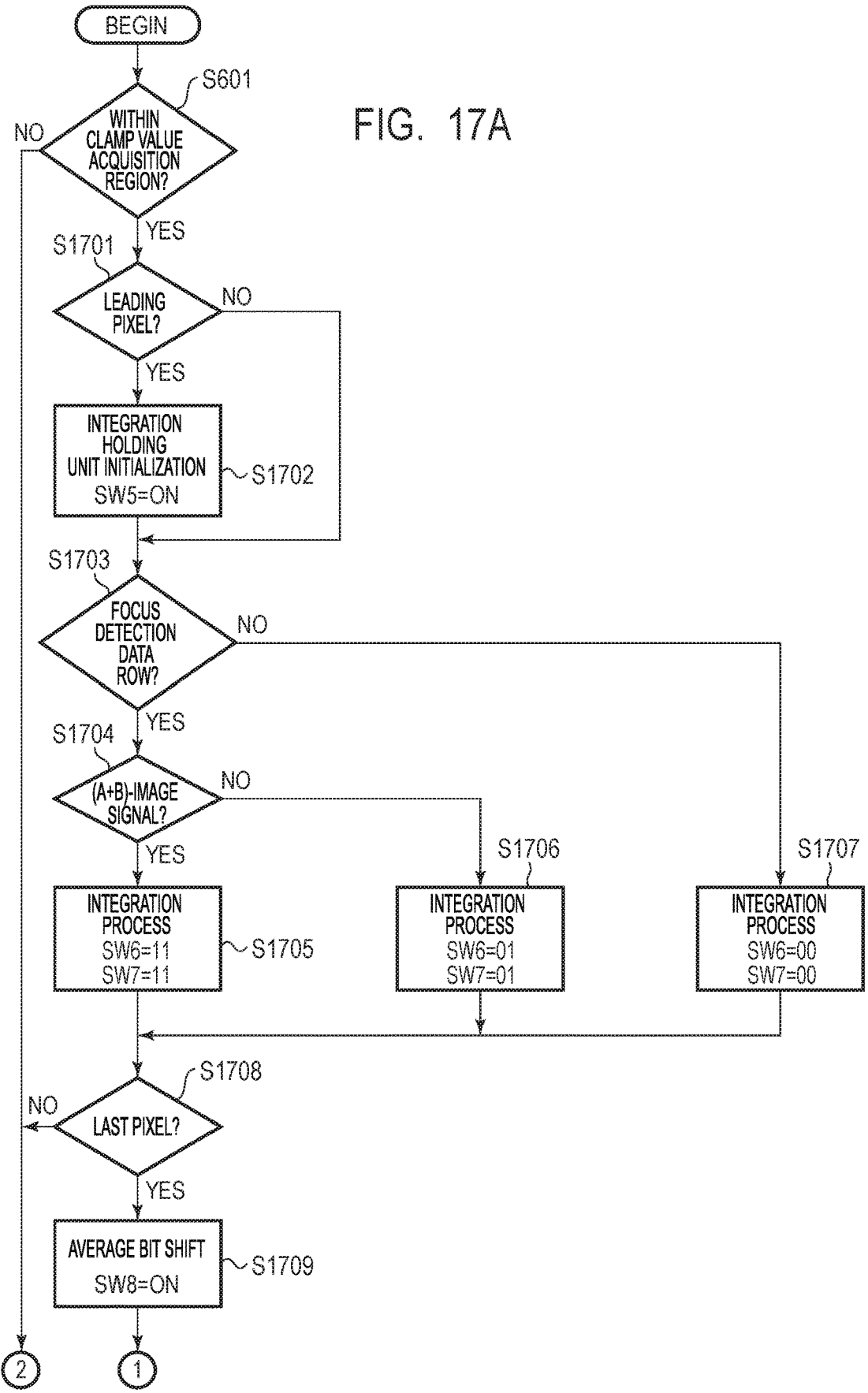

FIG. 17A and FIG. 17B are flowcharts illustrating a method of generating a clamp value in the imaging device of the present embodiment. When a clamp value is generated, data is loaded sequentially from a data group output from the pixel unit 101, and a process in accordance with the flowcharts illustrated in FIG. 17A and FIG. 17B is performed on data of each of the unit pixels 102. A clamp value for each of the unit pixels 102 is generated in accordance with step S601 to step S615 illustrated in FIG. 17A and FIG. 17B.

First, in step S601, it is determined whether or not the target data is data within the clamp value acquisition region. As a result of the determination, if the target data is data within the clamp value acquisition region (Yes), the process proceeds to step S1701, and if the target data is not data within the clamp value acquisition region (No), the process proceeds to step S611.

In step S1701, it is determined whether or not the target data is data of the leading pixel. Herein, the leading pixel means the first processed pixel on each row of the clamp value acquisition region. If the target data is data of the leading pixel (Yes), the process proceeds to step S1702, and if the target data is not data of the leading pixel (No), the process proceeds to step S1703.

In step S1702, the values of held data of the integration holding units 1801, 1802, and 1803 are set to zero. That is, the TG unit 104 sets the control signal SW5 input to the reset terminals RST of the integration holding units 1801, 1802, and 1803 to the High level (SW5=ON) and sets the values of held data of the integration holding units 1801, 1802, and 1803 to zero. This process is an initialization process performed for the leading pixel on each row. After the process of step S1702, the process proceeds to step S1703.

In step S1703, it is determined whether or not the target data is data of the focus detection data row. As a result of the determination, if the target data is data of the focus detection data row (Yes), the process proceeds to step S1704, and if the target data is not data of the focus detection data row (No), the process proceeds to step S1707.

In step S1704, it is determined whether the target data is the (A+B)-image signal or the A-image signal of the focus detection data row. As a result of the determination, if the target data is the (A+B)-image signal of the focus detection data row (Yes), the process proceeds to step S1705, and if the target data is the A-image signal of the focus detection data row (No), the process proceeds to step S1706.

In step S1707, an integration process is performed on pixel data of the captured image data row with SW6=00 and SW7=00. That is, when the target data is data of the captured image data row of the clamp value acquisition region, the target data is added to an integrated data used for the captured image data row held in the integration holding unit 1801, and the added data is held in the integration holding unit 1801. After the process of step S1707, the process proceeds to step S1708.

In step S1705, an integration process is performed on the (A+B)-image signal of the focus detection data row with SW6=11 and SW7=11. That is, when an (A+B)-image signal of the focus detection data row is processed, the target data is added to an integrated data used for the (A+B)-image signal of the focus detection data row held in the integration holding unit 1803, and the added data is held in the integration holding unit 1803. After the process of step S1705, the process proceeds to step S1708.

In step S1706, an integration process is performed on the A-image signal of the focus detection data row with SW6=01 and SW7=01. That is, when an A-image signal of the focus detection data row is processed, the target data is added to an integrated data used for the A-image signal of the focus detection data row held in the integration holding unit 1802, and the added data is held in the integration holding unit 1802. After the process of step S1706, the process proceeds to step S1708.

In step S1708, it is determined whether or not the target data is from the last pixel. Here, the last pixel means a pixel means the last processed pixel on each row of the clamp value acquisition region. As a result of the determination, if the target data is from the last pixel (Yes), the process proceeds to step S1709, and if the target data is not from the last pixel (No), the process proceeds to step S611.

In step S1709, the TG unit 104 controls the control signal SW8 to the High level to turn on the switch 1808 (SW8=ON) and inputs the integrated data processed in steps S1705 to S1707 to the bit shift unit 1804. In the bit shift unit 1804, an averaging process is performed on the integrated data. Thereby, the averaged operation value on each row of the clamp value acquisition region can be calculated. After the process of step S1709, the process proceeds to step S602.

The operations of steps S602 to S605, S901, S902, and S608 to S615 are the same as the operation of steps S602 to S605, S901, S902, and S608 to S615 described with reference to FIG. 6 and FIG. 9 in the first and second embodiments.

As described above, in the present embodiment, when there are N consecutive focus detection data rows, a clamp value used for the captured image data row that already follows shading in the vertical direction is used as a reference only for generation of a correction value for the leading pixel on the first row. The clamp value is then caused to follow the level difference of the focus detection data rows over N rows. Therefore, the present embodiment enables black level correction that follows the level difference of respective focus detection data rows in addition to shading in the vertical direction.

Further, unlike the first to fourth embodiments, the present embodiment is configured without using an LPF as a clamp value generation unit. Therefore, the clamp value is no longer affected the most by the last processed data, and this enables more suitable clamp value generation.

Therefore, according to the present embodiment, it is possible to suitably performs not only black level correction used for a captured image data row but also black level correction used for a focus detection data row, and an imaging device that can obtain a good image can be provided.

Sixth Embodiment

An imaging device according to a sixth embodiment of the present invention will be described with reference to FIG. 19. The same components as those of the imaging device according to the first to fifth embodiments will be labeled with the same references, and the description thereof will be omitted or simplified.

Figure 19:
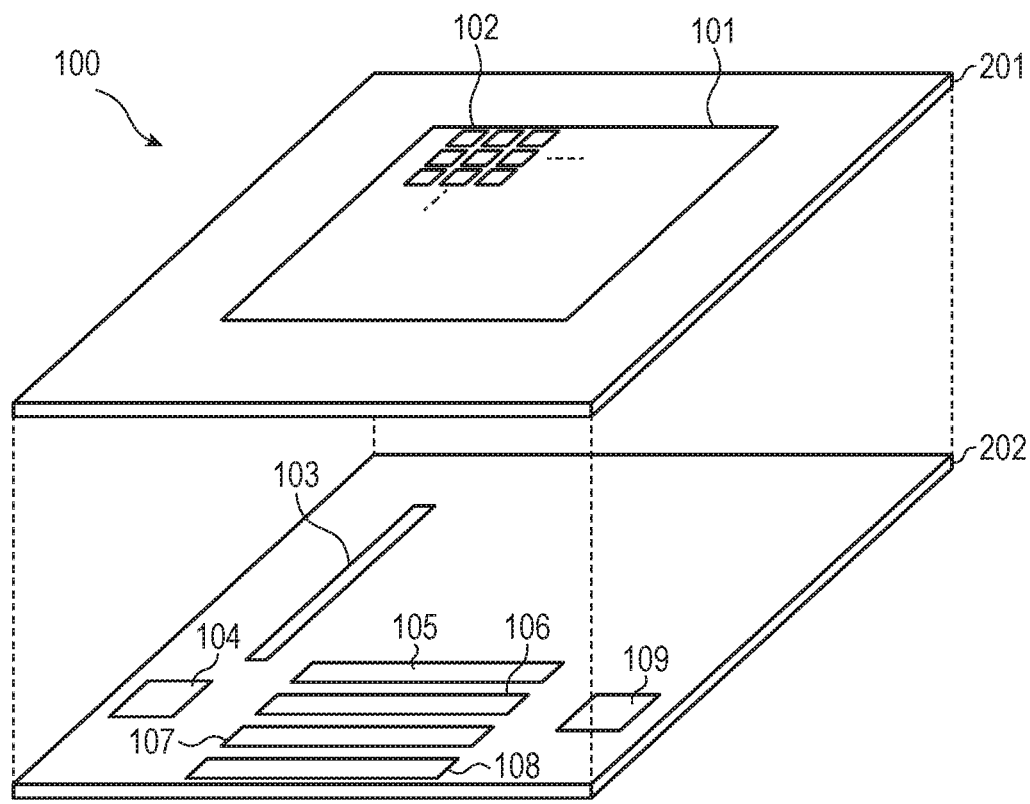
FIG. 19 is a schematic diagram illustrating a configuration example of an imaging device according to a sixth embodiment of the present invention.

FIG. 19 is a schematic diagram illustrating a configuration example of an imaging device according to the present embodiment. FIG. 19 illustrates an arrangement example on the semiconductor substrate of each block illustrated in FIG. 1. In the arrangement example illustrated in FIG. 19, out of components illustrated in FIG. 1, the pixel unit 101 is arranged on a substrate 201, and the vertical scanning unit 103, the TG unit 104, the readout circuit unit 105, the AD converter unit 106, the memory unit 107, the horizontal scanning unit 108, and the signal processing unit 109 are arranged on a substrate 202. Further, the imaging device 100 is configured by physically and electrically joining the substrate 201 and the substrate 202 to each other.

When the imaging device 100 is configured in such a way, the substrate 202 on which the vertical scanning unit 103, the TG unit 104, the readout circuit unit 105, the AD converter unit 106, the memory unit 107, the horizontal scanning unit 108, and the signal processing unit 109 are provided can be considered as a signal processing device as a whole. The signal processing device has at least the function of generating the clamp value and the offset value described above out of the functions provided to the signal processing unit 109.

With such a configuration of the imaging device 100, since the manufacturing process can be selected for an analog unit and a logic unit, respectively, good properties can be obtained, respectively.

Seventh Embodiment

Figure 21:
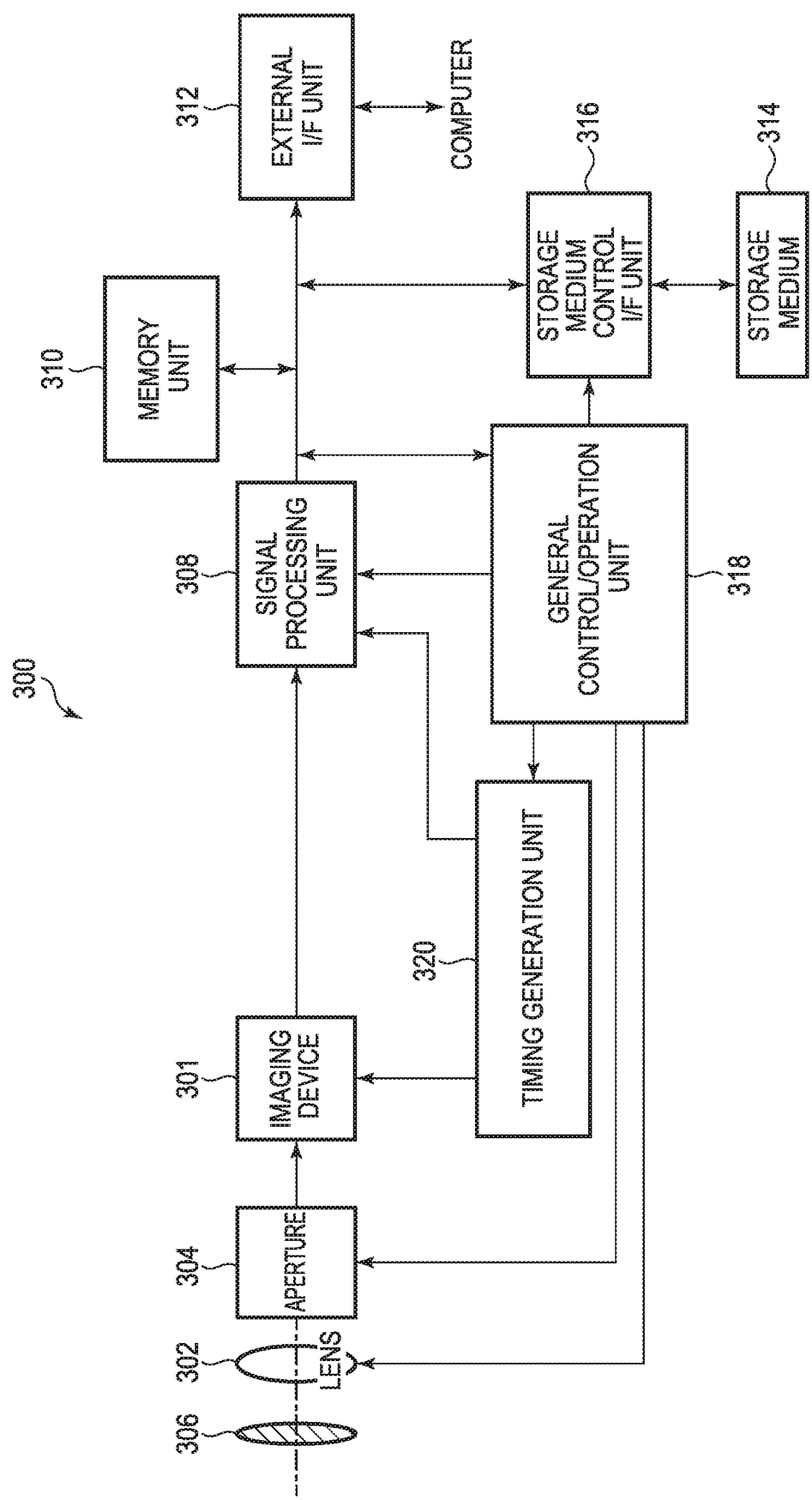
FIG. 21 is a block diagram illustrating a general configuration of an imaging system according to a seventh embodiment of the present invention.

An imaging system according to a seventh embodiment of the present invention will be described with reference to FIG. 21. FIG. 21 is a block diagram illustrating a general configuration of the imaging system according to the present embodiment.

The imaging devices 100 described in the above first to sixth embodiments are applicable to various imaging systems. An example of applicable imaging system may be a digital still camera, a digital camcorder, a surveillance camera, a copier machine, a fax machine, a mobile phone, an on-vehicle camera, an observation satellite, or the like. Further, a camera module having an optical system such as a lens and an imaging device is also included in the imaging system. FIG. 21 illustrates a block diagram of a digital still camera as one example of the above.

An imaging system 300 illustrated in FIG. 21 as an example includes an imaging device 301, a lens 302 that captures an optical image of an object onto the imaging device 301, an aperture 304 for changing the amount of light passing through the lens 302, and a barrier 306 for protecting the lens 302. The lens 302 and the aperture 304 form an optical system that collects a light onto the imaging device 301. The imaging device 301 is the imaging device 100 described in any of the first to sixth embodiments and converts an optical image captured by the lens 302 into image data.

The imaging system 300 further includes a signal processing unit 308 that performs processing on an output signal output from the imaging device 301. The signal processing unit 308 may be configured so as to perform some of functions provided to the imaging device 100 described in the first to sixth embodiments. For example, the signal processing unit 308 can be configured so as to perform at least some of processes performed by the signal processing unit 109. Further, the imaging device 301 may be configured so as to output an analog pixel signal and perform an AD conversion process in the signal processing unit 308. Further, the signal processing unit 308 performs operations to perform various correction or compression in addition to the above, if necessary, and output image data. The AD converter unit that is a part of the signal processing unit 308 may be formed on a semiconductor substrate on which the imaging device 301 is provided or may be formed on a different semiconductor substrate from the substrate on which the imaging device 301 is provided. Alternatively, the imaging device 301 and the signal processing unit 308 may be formed on the same semiconductor substrate.

Further, the imaging system 300 includes a memory unit 310 for temporarily storing image data therein and an external interface unit (external I/F unit) 312 for communicating with an external computer or the like. The imaging system 300 further includes a storage medium 314 such as a semiconductor memory for performing storage or readout of imaging data and a storage medium control interface unit (storage medium control I/F unit) 316 for performing storage or readout on the storage medium 314. Note that the storage medium 314 may be embedded in the imaging system 300 or may be removable.

Further, the imaging system 300 includes a general control/operation unit 318 that performs various calculation and controls the entire digital still camera and a timing generation unit 320 that outputs various timing signals to the imaging device 301 and the signal processing unit 308. Here, the timing signal or the like may be input from the outside, and the imaging system 300 may include at least the imaging device 301 and the signal processing unit 308 that processes an output signal output from the imaging device 301.

The imaging device 301 outputs an imaging signal to the signal processing unit 308. The signal processing unit 308 performs predetermined signal processing on the imaging signal output from the imaging device 301 and outputs image data. The signal processing unit 308 uses the imaging signal to generate an image.

As described above, according to the present embodiment, the imaging system to which the imaging device 100 according to the first to sixth embodiments is applied can be realized.

Eighth Embodiment

Figure 22A:
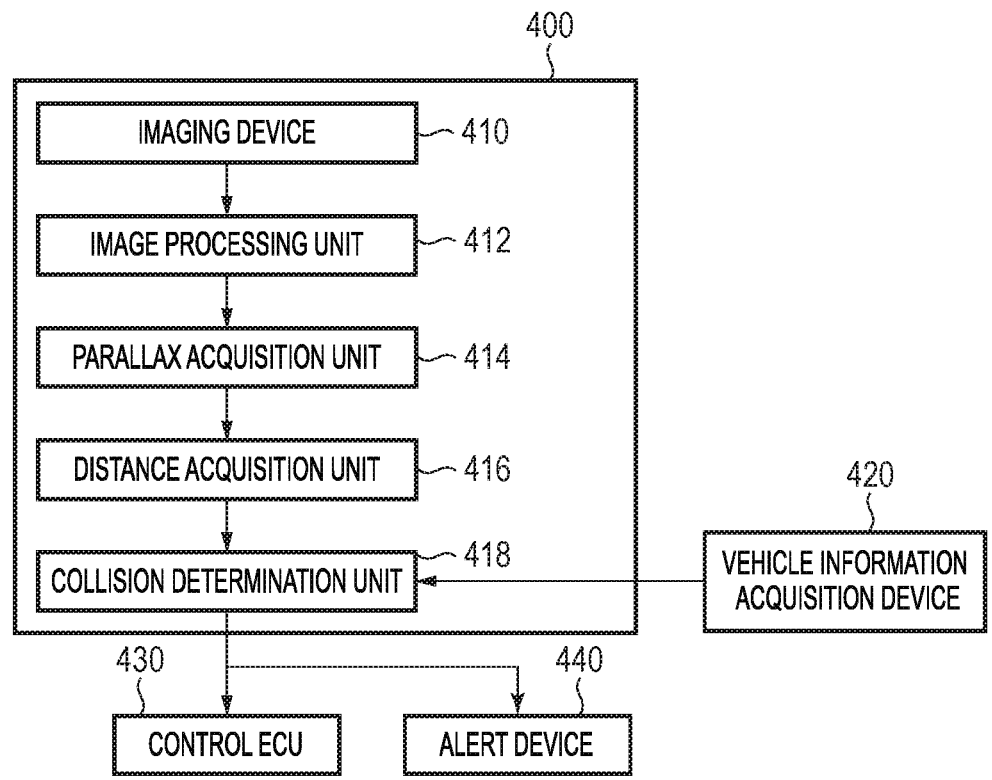
FIG. 22A is a diagram illustrating a configuration example of an imaging system according to an eighth embodiment of the present invention.
Figure 22B:
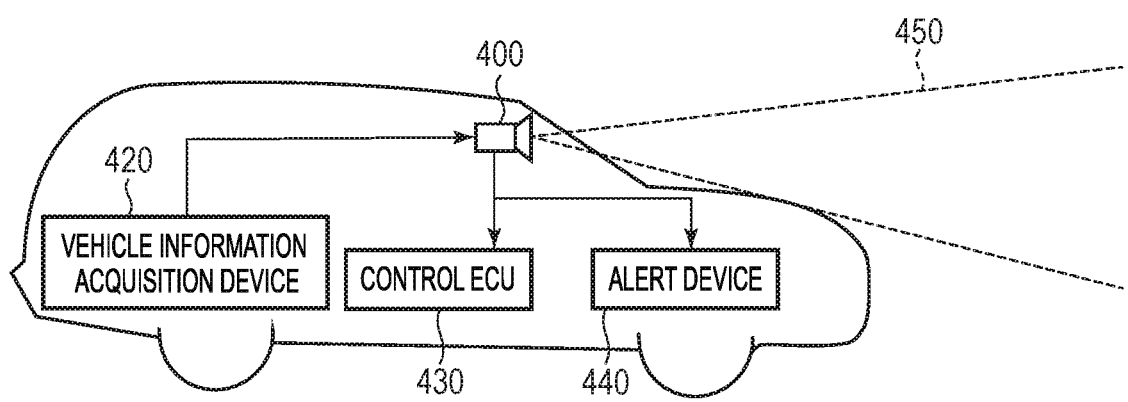
FIG. 22B is a diagram illustrating a configuration example of a movable object according to the eighth embodiment of the present invention.

An imaging system and a movable object according to an eighth embodiment of the present invention will be described with reference to FIG. 22A and FIG. 22B. FIG. 22A is a diagram illustrating a configuration of the imaging system according to the present embodiment. FIG. 22B is a diagram illustrating a configuration of the movable object according to the present embodiment.

FIG. 22A illustrates an example of an imaging system related to an on-vehicle camera. An imaging system 400 includes an imaging device 410. The imaging device 410 is the imaging device 100 described in any of the above first to sixth embodiments. The imaging system 400 includes an image processing unit 412 that performs image processing on a plurality of image data acquired by the imaging device 410 and a parallax acquisition unit 414 that calculates a parallax (a phase difference of parallax images) from the plurality of image data acquired by the imaging system 400. Further, the imaging system 400 includes a distance acquisition unit 416 that calculates a distance to the object based on the calculated parallax and a collision determination unit 418 that determines whether or not there is a collision possibility based on the calculated distance. Here, the parallax acquisition unit 414 and the distance acquisition unit 416 are an example of a distance information acquisition unit that acquires distance information on the distance to the object. That is, the distance information is information on a parallax, a defocus amount, a distance to an object, or the like. The collision determination unit 418 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like or may be implemented by a combination thereof.

The imaging system 400 is connected to the vehicle information acquisition device 420 and can acquire vehicle information such as a vehicle speed, a yaw rate, a steering angle, or the like. Further, the imaging system 400 is connected to a control ECU 430, which is a control device that outputs a control signal for causing a vehicle to generate braking force based on a determination result by the collision determination unit 418. Further, the imaging system 400 is also connected to an alert device 440 that issues an alert to the driver based on a determination result by the collision determination unit 418. For example, when the collision probability is high as the determination result of the collision determination unit 418, the control ECU 430 performs vehicle control to avoid a collision or reduce damage by applying a brake, pushing back an accelerator, suppressing engine power, or the like. The alert device 440 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 400. FIG. 22B illustrates the imaging system when a front area of a vehicle (a capturing area 450) is captured. The vehicle information acquisition device 420 transmits an instruction to the imaging system 400 or the imaging device 410. Such a configuration can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a movable object (moving apparatus) such as a ship, an airplane, or an industrial robot, for example. In addition, the imaging system can be widely applied to a device which utilizes object recognition, such as an intelligent transportation system (ITS), without being limited to movable objects.

MODIFIED EMBODIMENTS

The present invention is not limited to the embodiments described above, and various modifications are possible.

For example, an example in which a part of the configuration of any of the embodiments is added to another embodiment or an example in which a part of the configuration of any of the embodiments is replaced with a part of the configuration of another embodiment is also one of the embodiments of the present invention.

Further, the signal processing unit 109 described in the above first to sixth embodiments may be provided inside the imaging device 100 or outside the imaging device 100. When an imaging system is configured by using the imaging device 100, as described in the seventh embodiment, for example, a signal processing unit provided outside the imaging device 100 may have the function of the signal processing unit 109.

Further, the present invention can be embodied as a signal processing device having the function of the signal processing unit 109. In such a case, the signal processing device may be configured to include an input unit to which a first data group including a plurality of captured image data and a second data group including a plurality of focus detection data are input and a processing unit that processes the first data group and the second data group input to the input unit.

Further, while the unit pixel 102 having two photoelectric converters 102A and 102B as a unit pixel has been illustrated as an example in the above first to sixth embodiments, the unit pixel may be configured to include three or more photoelectric converters.

Further, although a device intended for acquisition of an image, that is, an imaging device has been illustrated as an example in the first to sixth embodiments, the application example of the present invention is not necessarily limited to an imaging device. For example, in a case of application to a device intended for ranging as described in the above eighth embodiment, such a device is not necessarily required to output an image. In such a case, it can be said that such a device is a photoelectric conversion device that converts optical information into a predetermined electrical signal. An imaging device is one of the photoelectric conversion devices.

Further, the imaging systems illustrated in the seventh and eighth embodiments described above are examples of an imaging system to which the photoelectric conversion device of the present invention may be applied, and an imaging system to which the photoelectric conversion device of the present invention can be applied is not limited to the configuration illustrated in FIG. 21 and FIG. 22A.

Further, the present invention can also be realized by a process in which a program implementing one or more functions of the embodiments described above is supplied to a system or a device via a network or a storage medium and then one or more processors in a computer of the system or the device read out and execute the program. Further, the present invention can be realized by using a circuit (for example, an ASIC) that implements one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-066818, filed Mar. 29, 2019 which is hereby incorporated by reference herein in its entirety.

What is claimed is:
1. An imaging device comprising:
a pixel unit in which a plurality of unit pixels each including a plurality of photoelectric converters are arranged in a matrix; and
a signal processing unit that processes signals read out from the pixel unit,
wherein the pixel unit includes
a first reference pixel region including the unit pixels each driven in a first mode to read out a signal in accordance with a combined charge obtained by combining charges generated by the plurality of photoelectric converters, and
a second reference pixel region including the unit pixels each driven in a second mode to read out signals, the number of which is greater than the number of the signal read out in the first mode, including at least a signal in accordance with charges generated by a part of the plurality of photoelectric converters and a signal in accordance with a combined charge obtained by combining charges generated by the plurality of photoelectric converters, and wherein the signal processing unit is configured to
calculate a first correction value in accordance with an average value of a first data group read out from the first reference pixel region in the first mode, and
calculate a second correction value in accordance with an average value of a second data group read out from the second reference pixel region in the second mode by using the first correction value as an initial value.

2. The imaging device according to claim 1,
wherein the signal processing unit includes a holding unit that holds data and is configured to, when calculating the second correction value, load data sequentially from the second data group and, every time loading data, calculate an average value from the data loaded from the second data group and the data read out from the holding unit and hold the calculated average value in the holding unit, and
wherein the holding unit holds the first correction value as the initial value when processing data corresponding to a leading unit pixel of the second reference pixel region out of the second data group.

3. The imaging device according to claim 1,
wherein the signal processing unit includes a first holding unit and a second holding unit,
wherein the signal processing unit is configured to, when calculating the first correction value, load data sequentially from the first data group and, every time loading data, calculate an average value from the data loaded from the first data group and the data read out from the first holding unit and hold the calculated average value in the first holding unit,
wherein the signal processing unit is configured to, when calculating the second correction value, load data sequentially from the second data group and, every time loading data, calculate an average value from the data loaded from the second data group and the data read out from the second holding unit and hold the calculated average value in the second holding unit, and
wherein the signal processing unit reads out the first correction value from the first holding unit as the initial value when processing data corresponding to the leading unit pixel of the second reference pixel region out of the second data group.

4. The imaging device according to claim 1,
wherein the second reference pixel region includes a plurality of rows, and
wherein the signal processing unit uses the first correction value as an initial value when processing data corresponding to a leading unit pixel on each of the plurality of rows.

5. The imaging device according to claim 1,
wherein the second data group includes a first group corresponding to a signal in accordance with charges generated by some of the plurality of photoelectric converters and a second group corresponding to a signal in accordance with a combined charge obtained by combining charges generated by the plurality of photoelectric converters, and wherein the signal processing unit calculates the second correction value for each of the first group and the second group.

6. The imaging device according to claim 1,
wherein the pixel unit further includes a third reference pixel region including the unit pixels driven in the first mode and a fourth reference pixel region including the unit pixels driven in the second mode, and
wherein the signal processing unit calculates an offset value in accordance with a difference between an average value of a third data group read out from the third reference pixel region in the first mode and an average value of a fourth data group read out from the fourth reference pixel region in the second mode and uses the first correction value obtained by adding the offset value as the initial value.

7. The imaging device according to claim 1,
wherein the signal processing unit further includes a third reference pixel region including the unit pixels driven in a third mode in which only a noise signal is read out without transferring charges from the plurality of photoelectric converters in the first mode and a fourth reference pixel region including the unit pixels driven in a fourth mode in which only a noise signal is read out without transferring charges from the plurality of photoelectric converters in the second mode, and
wherein the signal processing unit calculates an offset value in accordance with a difference between an average value of a third data group read out from the third reference pixel region in the third mode and an average value of a fourth data group read out from the fourth reference pixel region in the fourth mode and uses the first correction value obtained by adding the offset value as the initial value.

8. The imaging device according to claim 1,
wherein the signal processing unit further includes an average calculation unit that calculates each average calculation value of the first data group and the second data group, and
wherein the signal processing unit uses the average calculation value of the first data group when calculating an average value of the first data group and uses the average calculation value of the second data group when calculating an average value of the second data group.

9. The imaging device according to claim 1,
wherein the first data group is captured image data, and
wherein the second data group is focus detection data.

10. The imaging device according to claim 1,
wherein the first correction value is a correction value used for correcting a signal read out from a first light receiving pixel region including the unit pixels driven in the first mode, and
wherein the second correction value is a correction value used for correcting a signal read out from a second light receiving pixel region including the unit pixels driven in the second mode.

11. The imaging device according to claim 1 further comprising a first substrate on which the pixel unit is provided and a second substrate which is joined to the first substrate and on which the signal processing unit is provided.

12. A signal processing device comprising:
an input unit to which a first data group including a plurality of captured image data and a second data group including a plurality of focus detection data are input; and a processing unit that processes the first data group and the second data group input to the input unit, wherein the processing unit is configured to
calculate a first correction value in accordance with an average value of the first data group and
calculate a second correction value in accordance with an average value of the second data group by using the first correction value as an initial value.

13. The signal processing device according to claim 12 further comprising a holding unit that holds data,
wherein the processing unit is configured to, when calculating the second correction value, load data sequentially from the second data group and, every time loading data, calculate an average value from the data loaded from the second data group and the data read out from the holding unit and hold the calculated average value in the holding unit, and
wherein the holding unit holds the first correction value as the initial value when processing leading data of the second data group.

14. An imaging system comprising:
the imaging device according to claim 1; and
a signal processing device that processes a signal output from the imaging device.

15. A movable object comprising:
the imaging device according to claim 1;
a distance information acquisition unit that acquires distance information on a distance to an object, from a parallax image based on signals from the imaging device; and
a control unit that controls the movable object based on the distance information.

* * * * *